(12) United States Patent
Lee et al.

(10) Patent No.: US 11,042,240 B2
(45) Date of Patent: Jun. 22, 2021

(54) ELECTRONIC DEVICE AND METHOD FOR DETERMINING UNDERWATER SHOOTING

(71) Applicant: Samsung Electronics Co., Ltd., Gyeonggi-do (KR)

(72) Inventors: John Lee, Seoul (KR); Kyung Jun Lee, Gyeonggi-do (KR); Chae Kyung Lee, Seoul (KR); Jeong Won Ko, Seoul (KR); Giang Yoon Kwon, Seoul (KR); Young Mi Kim, Seoul (KR); Myoung Soo Park, Gyeonggi-do (KR); Jung Woo Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/897,789

(22) Filed: Feb. 15, 2018

(65) Prior Publication Data

US 2018/0234624 A1 Aug. 16, 2018

(30) Foreign Application Priority Data

Feb. 15, 2017 (KR) .................... 10-2017-0020418

(51) Int. Cl.
| | |
|---|---|
| *G06F 3/045* | (2006.01) |
| *G06F 3/048* | (2013.01) |
| *G06F 3/041* | (2006.01) |
| *H04N 5/232* | (2006.01) |
| *G06F 3/0488* | (2013.01) |
| *G06F 3/044* | (2006.01) |

(52) U.S. Cl.
CPC ............ *G06F 3/0416* (2013.01); *G06F 3/044* (2013.01); *G06F 3/0488* (2013.01); *H04N 5/23216* (2013.01); *H04N 5/23222* (2013.01); *H04N 5/23293* (2013.01)

(58) Field of Classification Search
CPC ...... G06F 3/0488; G06F 3/044; G06F 3/0416; H04N 5/23222; H04N 5/23293; H04N 5/23216
See application file for complete search history.

(56) References Cited

U.S. PATENT DOCUMENTS

| | | | | |
|---|---|---|---|---|
| 8,023,031 | B2 * | 9/2011 | Ikeda | ................. H04N 5/23293 348/333.04 |
| 9,183,560 | B2 * | 11/2015 | Abelow | ................. G06Q 10/10 |
| 9,270,387 | B2 * | 2/2016 | Wolfe | .................... H04B 13/02 |
| 9,280,038 | B1 * | 3/2016 | Pan | ........................ F16M 11/12 |

(Continued)

OTHER PUBLICATIONS

European Search Report dated Jun. 5, 2018 issued in counterpart application No. 18156806.4-1216, 11 pages.

*Primary Examiner* — Philip P. Dang
(74) *Attorney, Agent, or Firm* — The Farrell Law Frim, P.C.

(57) ABSTRACT

Disclosed is an electronic device including a camera, a touch screen display recognizing a touch input, an input interface receiving an input from a user of the electronic device, an input/output interface connected to an external device, and a processor electrically connected to the camera, the touch screen display, the input interface, and the input/output interface. The processor is configured to determine, if an operation associated with the camera is performed, whether the electronic device is in water, based on an electrical signal sensed from the input/output interface and information obtained from the touch screen display.

16 Claims, 16 Drawing Sheets

(56) References Cited

U.S. PATENT DOCUMENTS

| | | | |
|---|---|---|---|
| 9,477,307 B2* | 10/2016 | Chizeck | A61B 34/25 |
| 9,571,735 B2* | 2/2017 | Karn | H04N 5/232935 |
| 9,661,473 B1* | 5/2017 | Jarvis | H04W 4/043 |
| 9,681,048 B2* | 6/2017 | Sudo | H04N 5/23245 |
| 9,712,756 B2* | 7/2017 | Sudo | H04N 5/232935 |
| 9,733,767 B2* | 8/2017 | Shin | G06F 3/044 |
| 9,838,609 B2* | 12/2017 | Ogawa | H04N 5/232945 |
| 10,128,670 B2* | 11/2018 | Ban | H02J 7/007 |
| 10,165,978 B2* | 1/2019 | Kim | A61B 5/6898 |
| 2012/0176237 A1* | 7/2012 | Tabe | F41H 3/02 |
| | | | 340/539.12 |
| 2012/0236173 A1* | 9/2012 | Telek | G03B 7/00 |
| | | | 348/223.1 |
| 2013/0009891 A1* | 1/2013 | Watanabe | G06F 3/0488 |
| | | | 345/173 |
| 2013/0019209 A1* | 1/2013 | Ishikawa | H04N 5/23293 |
| | | | 715/838 |
| 2013/0088602 A1* | 4/2013 | Unger | H04N 5/232939 |
| | | | 348/164 |
| 2014/0189563 A1 | 7/2014 | Kim | |
| 2014/0320629 A1* | 10/2014 | Chizeck | H04N 5/2256 |
| | | | 348/81 |
| 2015/0062069 A1 | 3/2015 | Shin et al. | |
| 2015/0268782 A1* | 9/2015 | Kim | G06F 3/0446 |
| | | | 345/174 |
| 2015/0286372 A1* | 10/2015 | Swindell | G06F 3/0482 |
| | | | 715/762 |
| 2016/0156837 A1* | 6/2016 | Rodzevski | G06F 3/017 |
| | | | 348/333.02 |
| 2016/0253795 A1* | 9/2016 | Cole | G06T 7/80 |
| | | | 345/426 |
| 2016/0274726 A1* | 9/2016 | Chung | G06F 3/014 |
| 2016/0373734 A1* | 12/2016 | Cole | H04N 17/002 |

* cited by examiner

ELECTRONIC DEVICE AND METHOD FOR DETERMINING UNDERWATER SHOOTING

PRIORITY

This application claims priority under 35 U.S.C. § 119 to a Korean Patent Application filed in the Korean Intellectual Property Office on Feb. 15, 2017 and assigned Serial No. 10-2017-0020418, the contents of which are incorporated herein by reference.

BACKGROUND

1. Field of the Disclosure

The present disclosure relates generally to an electronic device, and more particularly, to a technique for determining the ambient environment of an electronic device and providing a user interface suitable for the ambient environment.

2. Description of the Related Art

With the development of electronic technologies, various types of electronic products are being developed and distributed. For example, there is currently a wide use of smartphones, tablet personal computers (PCs), and wearable devices, and such electronic devices may have a waterproof function and a camera function for shooting an image. Thus, a user of the electronic device may shoot an image in water using the camera included in the electronic device.

When shooting the image, the electronic device may display a preview on a display. However, when the electronic device is in water, since the illumination sensed by the camera is low, the visibility of the preview may be degraded. In addition, the determination of whether the electronic device is in water is compromised.

As such, there is a need in the art for an electronic device that more accurately shoots underwater and determines the underwater environment.

The above information is presented as background information only to assist with an understanding of the present disclosure. No determination has been made, and no assertion is made, as to whether any of the above might be applicable as prior art with regard to the present disclosure.

SUMMARY

The present disclosure has been made to address the above-mentioned problems and disadvantages, and to provide at least the advantages described below.

Accordingly, an aspect of the present disclosure is to provide an electronic device and a method that determine whether the electronic device is in water and provide a user interface suitable for underwater shooting.

Another aspect of the present disclosure is to provide an electronic device in which the accuracy of determination is improved by determining whether an electronic device is in water, based on information obtained from an input/output interface and a touch screen display.

Another aspect of the present disclosure is to enhance the convenience of underwater shooting by providing a suitable user interface during underwater shooting.

In accordance with an aspect of the present disclosure, an electronic device includes a camera, a touch screen display recognizing a touch input, an input interface receiving an input from a user of the electronic device, an input/output interface connected to an external device, and a processor electrically connected to the camera, the touch screen display, the input interface, and the input/output interface. The processor is configured to determine, if an operation associated with the camera is performed, whether the electronic device is in water, based on an electrical signal sensed from the input/output interface and information obtained from the touch screen display.

In accordance with another aspect of the present disclosure, an electronic device includes a camera, a touch screen display recognizing a touch input, an input interface receiving an input from a user of the electronic device, an input/output interface connected to an external device, and a processor electrically connected to the camera, the touch screen display, the input interface, and the input/output interface. The processor is configured to display, if an operation associated with the camera is performed, a user interface associated with underwater shooting in the touch screen display based on an electrical signal sensed from the input/output interface and information obtained from the touch screen display.

In accordance with another aspect of the present disclosure, an environment determining method of an electronic device including a camera, a touch screen display, and an input/output interface includes performing an operation associated with the camera and determining whether the electronic device is in water, based on an electrical signal sensed from the input/output interface and information obtained from the touch screen display.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
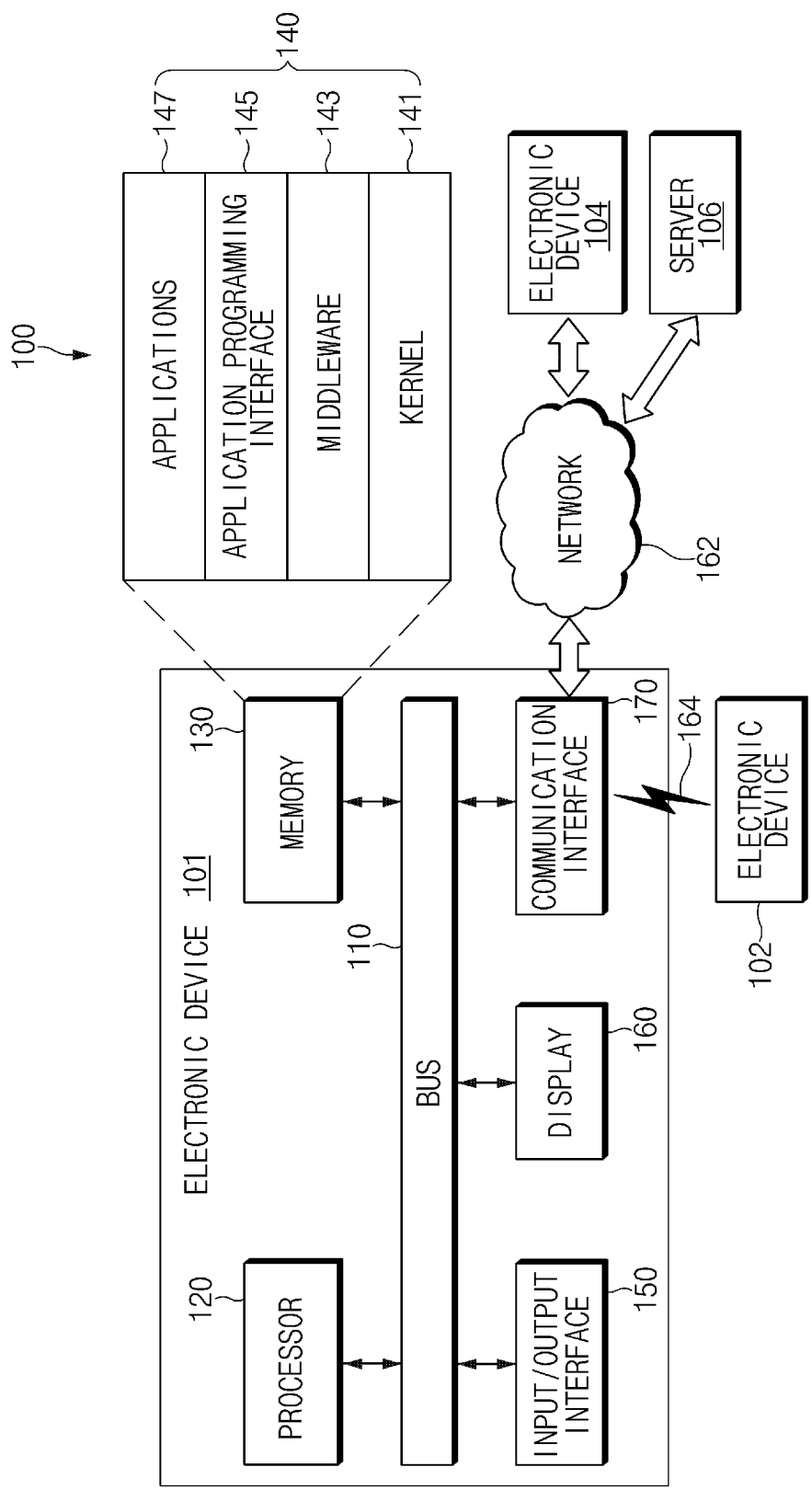
FIG. 1 illustrates an electronic device in a network environment, according to an embodiment of the present disclosure.

Hereinafter, embodiments of the present disclosure are described with reference to accompanying drawings. Embodiments and terms used herein are not intended to limit the technologies described in the present disclosure to specific embodiments, and it should be understood that the embodiments and the terms include modifications, equivalents, and/or alternatives on the corresponding embodiments described herein. Descriptions of well-known functions and/or configurations will be omitted for the sake of clarity and conciseness.

Herein, similar elements may be labeled by similar reference numerals. The terms of a singular form may include plural forms unless otherwise specified. The expressions such as "A or B" and "at least one of A or/and B" used herein may include any and all combinations of one or more of the associated listed items. Terms such as "first" and "second" may express their elements regardless of their priority or importance and may be used to distinguish one element from another element, but the present disclosure is not limited to these terms. When an element, such as a first element, is referred to as being operatively or communicatively coupled with/to or connected to another element, such as a second element, the first element may be directly coupled with/to or connected to the second element or an intervening element, such as a third element, may be present between the first and second elements.

According to the situation, the expression "configured to" may be interchangeably used as the expressions "suitable for", "having the capacity to", "designed to", "adapted to", "made to", or "capable of". The expression "a device configured to" may indicate that the device is "capable of" operating together with another device or other components. For example, a "processor configured to (or set to) perform A, B, and C" may indicate an embedded processor for performing a corresponding operation or a generic-purpose processor, such as a central processing unit (CPU) or an application processor, which performs corresponding operations by executing one or more software programs which are stored in a memory device.

According to embodiments of the present disclosure, an electronic device may include at least one of smartphones, tablet PCs, mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, medical devices, cameras, or wearable devices including at least one of an accessory type of a device, such as a timepiece, a ring, a bracelet, an anklet, a necklace, glasses, a contact lens, or a head-mounted-device (HMD), one-piece fabric or clothes type of a circuit, such as electronic clothes, a body-attached type of a circuit, such as a skin pad or a tattoo, or a bio-implantable type of a circuit.

The electronic device may also include at least one of televisions (TVs), digital versatile disc (DVD) players, audios, refrigerators, air conditioners, cleaners, ovens, microwave ovens, washing machines, air cleaners, set-top boxes, home automation control panels, security control panels, media boxes, such as Samsung HomeSync™, Apple TV™, or Google TV™, game consoles, such as Xbox™ or PlayStation™, electronic dictionaries, electronic keys, camcorders, or electronic picture frames.

According to another embodiment, the electronic devices may include at least one of portable medical measurement devices, such as a blood glucose monitoring device, a heartbeat measuring device, a blood pressure measuring device, a body temperature measuring device, a magnetic resonance angiography (MRA) device, a magnetic resonance imaging (MRI) device, a computed tomography (CT) device, scanners, ultrasonic devices, navigation devices, global navigation satellite system (GNSS) devices, event data recorders (EDRs), flight data recorders (FDRs), vehicle infotainment devices, electronic equipment for vessels, such as navigation systems and gyrocompasses, avionics, security devices, head units for vehicles, industrial or home robots, drones, automated teller machines (ATMs), points of sales (POS) devices, and Internet of things (IoT) devices, such as light bulbs, various sensors, sprinkler devices, fire alarms, thermostats, street lamps, toasters, exercise equipment, hot water tanks, heaters, and boilers. The electronic devices may include at least one of parts of furniture, buildings/structures, or vehicles, electronic boards, electronic signature receiving devices, projectors, or various measuring instruments, such as water meters, electricity meters, gas meters, or wave meters.

According to embodiments, an electronic device may be flexible or a combination of at least two of the above-described devices, but is not be limited to the above-described electronic devices. The term "user" used herein may refer to a person who uses an electronic device or to an artificial intelligence electronic device that uses an electronic device.

FIG. 1 illustrates an electronic device 101 in a network environment 100 according to an embodiment of the present disclosure. The electronic device 101 may include a bus 110, a processor 120, a memory 130, an input/output (I/O) interface 150, a display 160, and a communication interface 170. The electronic device 101 may exclude at least one of the above-described elements or may further include other element(s). The bus 110 may interconnect the above-described elements 120 to 170 and may include a circuit for conveying communications, such as a control message or data, among the above-described elements. The processor 120 may include one or more of a central processing unit (CPU), an application processor (AP), and a communication processor (CP), and may perform data processing or an operation associated with control or communication of at least one other element(s) of the electronic device 101.

The memory 130 may include a volatile and/or nonvolatile memory. For example, the memory 130 may store instructions or data associated with at least one other element(s) of the electronic device 101, and may store software and/or a program 140 including a kernel 141, a middleware 143, an application programming interface (API) 145, and/or application programs (or applications) 147. At least a part of the kernel 141, the middleware 143, or the API 145 may be referred to as an operating system (OS). The kernel 141 may control or manage system resources, such as the bus 110, the processor 120, and the memory 130, that are used to execute operations or functions of other programs, such as the middleware 143, the API 145, and the applications 147, and may provide an interface that enables the middleware 143, the API 145, or the applications 147 to access discrete elements of the electronic device 101 so as to control or manage system resources.

The middleware 143 may perform a mediation role such that the API 145 or the applications 147 communicate with the kernel 141 to exchange data, and may process one or more task requests received from the applications 147 according to a priority. For example, the middleware 143 may assign the priority, which enables use of a system resource of the electronic device 101, to at least one of the applications 147 and may process the task requests. Through the API 145, the applications 147 control a function provided by the kernel 141 or the middleware 143, and the API 145 may include at least one interface or instruction for a file control, a window control, image processing, or character control. For example, the I/O interface 150 may transmit an instruction or data, input from a user or another external device, to other element(s) of the electronic device 101, or may output an instruction or data, input from the other element(s) of the electronic device 101, to the user or the external device.

The display 160 may include a liquid crystal display (LCD), a light-emitting diode (LED) display, an organic LED (OLED) display, or a microelectromechanical systems (MEMS) display, or an electronic paper display, may display various types of content, such as a text, image, video, icon, or symbol to a user, and may include a touch screen that receives a touch, gesture, proximity, or hovering input using an electronic pen or a portion of a user's body. The communication interface 170 may establish communication between the electronic device 101 and an external electronic device, such as a first external electronic device 102, a second external electronic device 104, or a server 106, and may be connected to a network 162 through wireless communication or wired communication to communicate with an external device.

The wireless communication may include a cellular communication that uses at least one of long-term evolution (LTE), LTE Advanced (LTE-A), code division multiple access (CDMA), wideband CDMA (WCDMA), universal mobile telecommunications system (UMTS), wireless broadband (WiBro), or global system for mobile communications (GSM). The local area network may include at least one of wireless fidelity (Wi-Fi), Bluetooth®, Bluetooth low energy (BLE), Zigbee®, near field communication (NFC), magnetic secure transmission (MST), radio frequency (RF), or body area network (BAN). Wireless communication may include GNSS, which may be a global positioning system (GPS), a global navigation satellite system (Glonass), a Beidou navigation satellite system (Beidou), or a European global satellite-based navigation system (Galileo). In this specification, "GPS" and "GNSS" may be interchangeably used. Wired communication may include at least one of a universal serial bus (USB), high definition multimedia interface (HDMI), recommended standard-232 (RS-232), power line communication, or plain old telephone service (POTS), for example. The network 162 may include at least one of a telecommunication network or a computer network, such as a local area network (LAN) or wide area network (WAN), the Internet, or a telephone network.

Each of the first and second external electronic devices 102 and 104 may be the same type as or a different type than of the electronic device 101. According to embodiments, all or a part of operations that the electronic device 101 will perform may be executed by another or plural electronic devices, such as the electronic devices 102 and 104 or the server 106. When the electronic device 101 executes any function or service automatically or in response to a request, the electronic device 101 may not perform the function or the service internally, but, alternatively or additionally, may request at least a part of a function associated with the electronic device 701 at another device, which may execute the requested function or additional function and may transmit the execution result to the electronic device 101 which may provide the requested function or service by processing the received result additionally or as-is. To this end, cloud computing, distributed computing, or client-server computing may be used.

Figure 2:
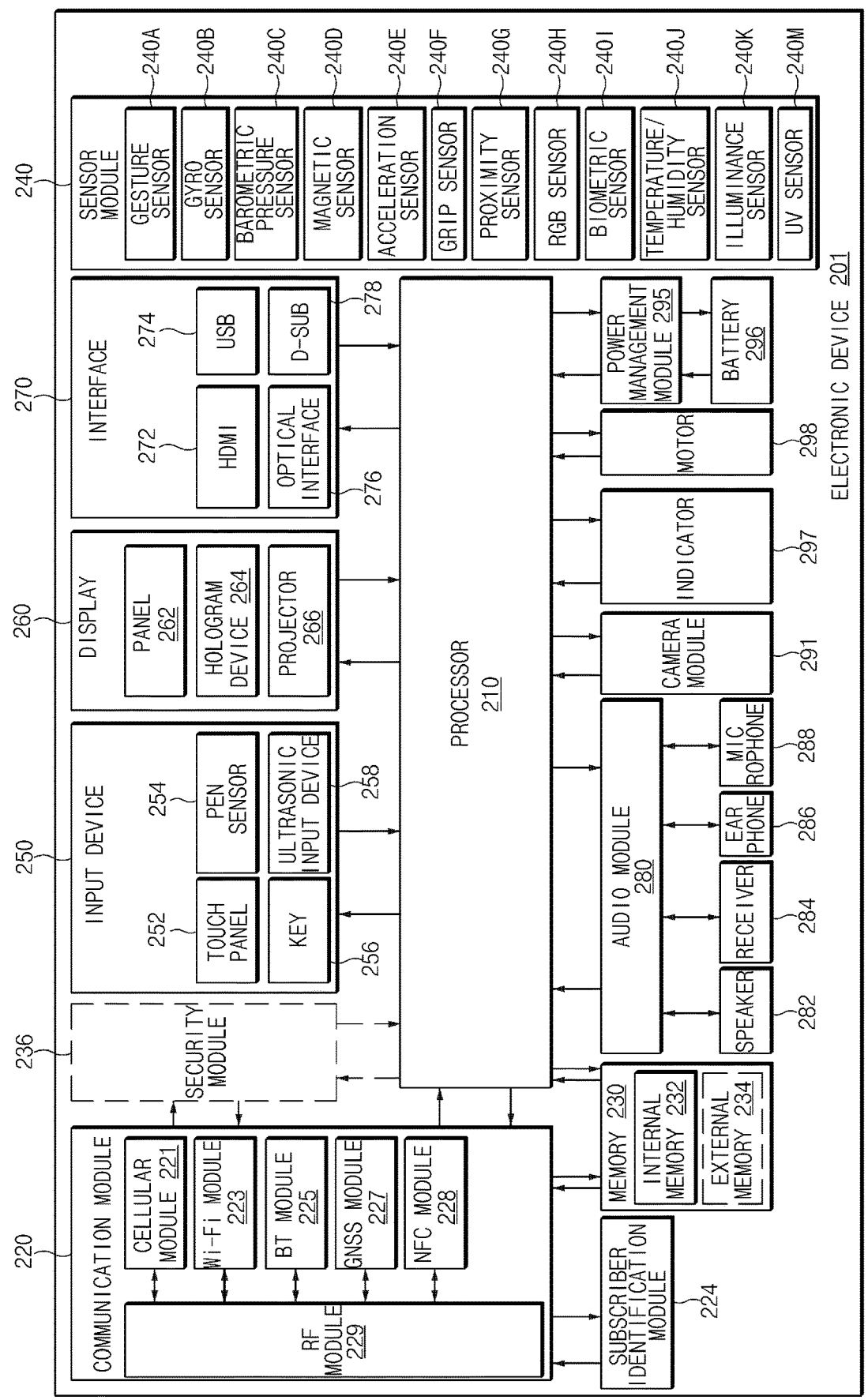
FIG. 2 illustrates a block diagram of the electronic device, according to an embodiment of the present disclosure.

FIG. 2 illustrates an electronic device 201 according to embodiments of the present disclosure. The electronic device 201 may include all or a part of an electronic device 101 illustrated in FIG. 1 and may include one or more processors, such as an AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may drive an OS or an application to control a plurality of hardware or software elements connected to the processor 210, may process and compute a variety of data, may be implemented with a system on chip (SoC), for example, may further include a graphic processing unit (GPU) and/or an image signal processor, may include at least a part of elements illustrated in FIG. 2, and may load and process an instruction or data, which is received from at least one of other elements, such as a nonvolatile memory, and store resulting data in a nonvolatile memory.

The communication module 220 may be configured the same as or similar to a communication interface 170 and may include a cellular module 221, a wireless-fidelity (Wi-Fi) module 223, a Bluetooth® (BT) module 225, a GNSS module 227, a near field communication (NFC) module 228, and an RF module 229. The cellular module 221 may provide voice communication, video communication, a character service, or an Internet service through a communication network, may perform discrimination and authentication of the electronic device 201 within a communication network using the SIM card 224, may perform at least a portion of functions that the processor 210 provides, and may include a CP.

At least two of the cellular module 221, the Wi-Fi module 223, the BT module 225, the GPS module 227, and the NFC module 228 may be included within one integrated circuit (IC) or an IC package. The RF module 229 may transmit and receive an RF signal, and may include a transceiver, a power amplifier module (PAM), a frequency filter, a low noise amplifier (LNA), and an antenna. According to embodiments, at least one of the cellular module 221, the Wi-Fi module 223, the BT module 225, the GNSS module 227, and the NFC module 228 may transmit and receive an RF signal through a separate RF module. The SIM card 224 may include an embedded SIM which includes a SIM and may include unique identification information, such as an integrated circuit card identifier (ICCID) or subscriber information, such as integrated mobile subscriber identity (IMSI).

For example, the memory 230 may include at least one of an internal memory 232 and an external memory 234. For example, the internal memory 232 may include at least one of a volatile memory, such as a dynamic random access memory (DRAM), a static RAM (SRAM), and a synchronous DRAM (SDRAM), and a nonvolatile memory, such as a one-time programmable read only memory (OTPROM), a programmable ROM (PROM), an erasable and programmable read only memory (EPROM), an electrically erasable and programmable ROM (EEPROM), a mask ROM, a flash ROM, a flash memory, a hard drive, and a solid state drive (SSD). The external memory 234 may include a flash drive, such as a compact flash (CF), secure digital (SD), micro secure digital (micro-SD), mini secure digital (Mini-SD), extreme digital (xD), a multimedia card (MMC), or a memory stick, and may be functionally or physically connected with the electronic device 201 through various interfaces.

The sensor module 240 may measure a physical quantity or may detect an operating state of the electronic device 201, may convert the measured or detected information to an electric signal, and may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H, such as a red, green, blue (RGB) sensor, a living body (or biometric) sensor 240I, a temperature/humidity sensor 240J, an illuminance sensor 240K, an ultraviolet (UV) sensor 240M, an e-nose sensor, an electromyography sensor (EMG), an electroencephalogram (EEG) sensor, an electrocardiogram (ECG) sensor, an infrared (IR) sensor, an iris sensor, and/or a fingerprint sensor, and a control circuit that controls at least one or more sensors included therein. The electronic device 201 may further include a processor which is a part of or independent of the processor 210 and is configured to control the sensor module 240. The processor may control the sensor module 240 while the processor 210 remains in a sleep state.

The input device 250 may include a touch panel 252, a (digital) pen sensor 254, a key 256, or an ultrasonic input device 258. The touch panel 252 may use at least one of capacitive, resistive, infrared and ultrasonic detecting methods, and may further include a control circuit and a tactile layer to provide a tactile reaction to a user. The (digital) pen sensor 254 may be a part of a touch panel or may include an additional sheet for recognition. The key 256 may include a physical button, an optical key, or a keypad, and the like. The ultrasonic input device 258 may detect (or sense) an ultrasonic signal, which is generated from an input device, through a microphone 288 and may verify data corresponding to the detected ultrasonic signal.

The display 260 may include a panel 262, a hologram device 264, a projector 266, and/or a control circuit that controls the panel 262, the hologram device 264, and the projector 266. The panel 262 may be implemented to be flexible, transparent or wearable, for example. The panel 262 and the touch panel 252 may be integrated into one or more modules. The panel 262 may include a pressure sensor (or a force sensor) that is capable of measuring the intensity of pressure on the touch of the user. The pressure sensor may be integrated with the touch panel 252 or may be implemented with one or more sensors that are independent of the touch panel 252. The hologram device 264 may display a stereoscopic image in space using a light interference phenomenon. The projector 266 may project light onto a screen so as to display an image. The screen may be arranged inside or outside the electronic device 201. The interface 270 may include a high-definition multimedia interface (HDMI) 272, a USB 274, an optical interface 276, or a D-subminiature (D-sub) 278, may be included in the communication interface 170 illustrated in FIG. 1, and may include a mobile high definition link (MHL) interface, an SD card/MMC interface, or an Infrared Data Association (IrDA) standard interface.

The audio module 280 may convert a sound and an electric signal in dual directions. At least a part of the audio module 280 may be included in the I/O interface 145 illustrated in FIG. 1. The audio module 280 may process sound information that is input or output through a speaker 282, a receiver 284, an earphone 286, or a microphone 288. The camera module 291 for shooting a still image or a video may include at least one image sensor, such as a front sensor and a rear sensor, a lens, an image signal processor (ISP), or a flash, such as an LED or a xenon lamp. The power management module 295 may manage power of the electronic device 201 and may include a power management integrated circuit (PMIC), a charger IC, or a battery gauge. The PMIC may have a wired charging method and/or a wireless charging method. The wireless charging method may include a magnetic resonance method, a magnetic induction method, or an electromagnetic method and may further include an additional circuit a coil loop, a resonant circuit, or a rectifier. The battery gauge may measure a remaining capacity of the battery 296 and a voltage, current or temperature thereof while the battery is charged. The battery 296 may include a rechargeable battery and/or a solar battery.

The indicator 297 may display a specific state of the electronic device 201 or a part thereof, such as a booting, message, or charging state. The motor 298 may convert an electrical signal into a mechanical vibration and may generate a vibration or haptic effect. For example, the electronic device 201 may include a mobile TV supporting device that processes media data according to the standards of digital multimedia broadcasting (DMB), digital video broadcasting (DVB), or MediaFlo™. Each of the above-mentioned elements of the electronic device according to embodiments of the present disclosure may be configured with one or more components, and the names of the elements may be changed according to the type of the electronic device. The electronic device 201 may exclude some elements or may further include other additional elements, and some of the elements of the electronic device may be combined with each other so as to form one entity, so that the functions of the elements may be performed in the same manner as prior to the combination.

Figure 3:
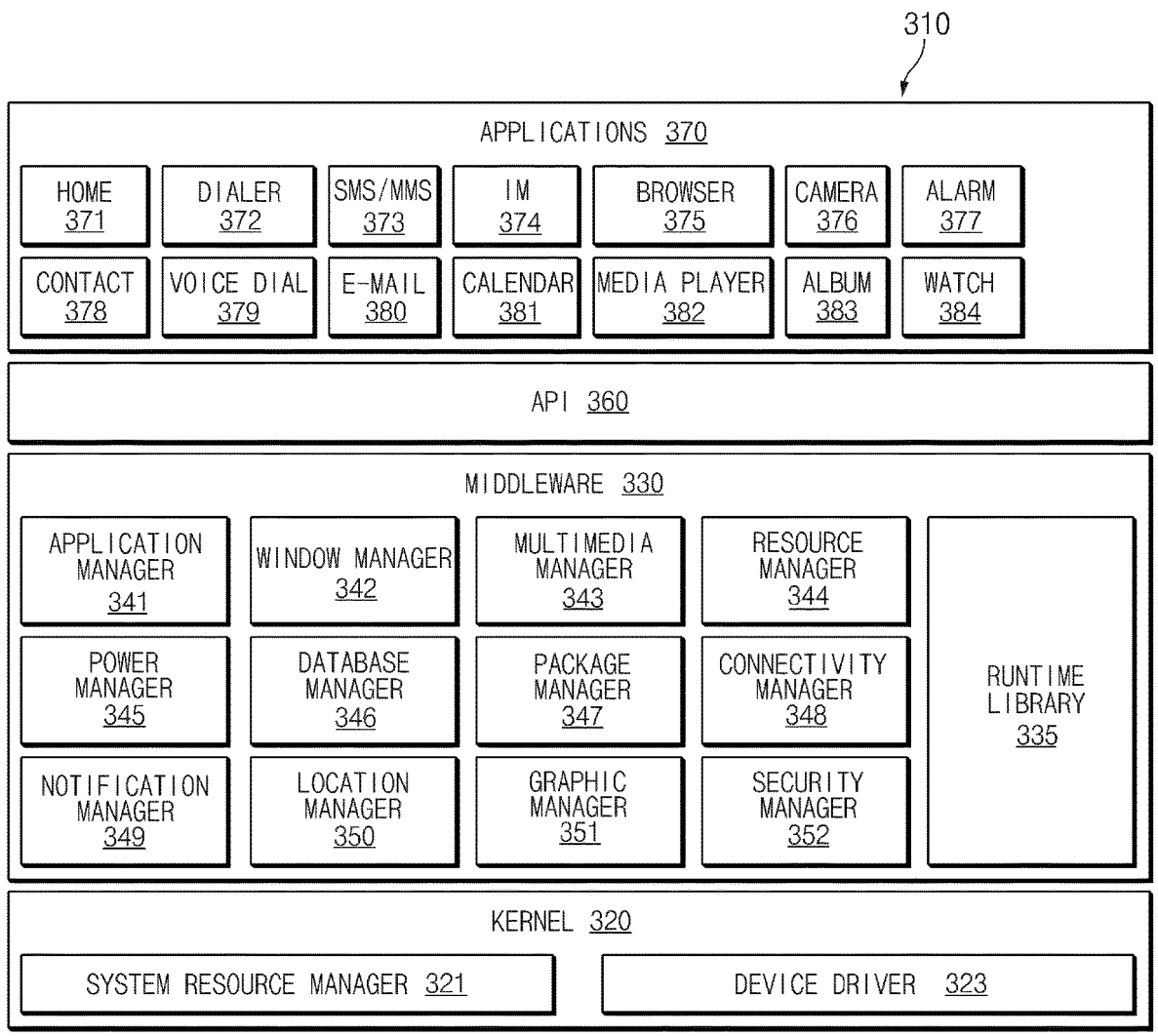
FIG. 3 illustrates a block diagram of a program module, according to an embodiment of the present disclosure.

FIG. 3 is a block diagram of a program module, according to embodiments of the present disclosure. In FIG. 3, a program module 310 may include an OS to control resources associated with an electronic device, and/or diverse applications driven on the OS. The OS may include Android™, iOS™, Windows™, Symbian™, Tizen™, or Bada™ but is not limited thereto. Referring to FIG. 3, the program module 310 may include a kernel 320, middleware 330, an API 360, and/or applications 370. At least a part of the program module 310 may be preloaded on an electronic device or may be downloadable from an external electronic device.

The kernel 320 may include a system resource manager 321 and/or a device driver 323. The system resource manager 321 may perform control, allocation, or retrieval of system resources and may include a process managing unit, a memory managing unit, or a file system managing unit. The device driver 323 may include a display driver, a camera driver, a Bluetooth driver, a common memory driver, an USB driver, a keypad driver, a Wi-Fi driver, an audio driver, and an inter-process communication (IPC) driver. The middleware 330 may provide a function which the applications 370 need in common or may provide diverse functions to the applications 370 through the API 360 to enable the applications 370 to use limited system resources of the electronic device. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module, which is used by a compiler, to add a new function through a programming language while at least one of the applications 370 is being executed, and may perform input/output management, memory management, or processing of arithmetic functions. The application manager 341 may manage the life cycle of the applications 370. The window manager 342 may manage a GUI resource which is used in a screen. The multimedia manager 343 may identify a format necessary to play media files, and may perform encoding or decoding of media files by using a codec suitable for the format. The resource manager 344 may manage source code of the applications 370 or a space of a memory. For example, the power manager 345 may manage the capacity of a battery or power and may provide power information that is needed to operate an electronic device. The power manager 345 may operate in conjunction with a basic input/output system (BIOS). For example, the database manager 346 may generate, search for, or modify a database which is to be used in the applications 370. The package manager 347 may install or update an application which is distributed in the form of a package file.

The connectivity manager 348 may manage wireless connection. The notification manager 349 may provide a user with an event such as an arrival message, an appointment, or a proximity notification. The location manager 350 may manage location information of an electronic device. The graphic manager 351 may manage a graphic effect to be provided to a user or a user interface relevant thereto. The security manager 352 may provide system security or user authentication.

The middleware 330 may include a telephony manager, which manages a voice or video call function of the electronic device, or a middleware module that combines functions of the above-described elements, may provide a module specialized to each OS type, and may remove a part of the preexisting elements, dynamically, or may add new elements thereto. The API 360 may be a set of programming functions and may be provided with another configuration which is variable depending on an OS. For example, when the OS is android or iOS™, it may be permissible to provide one API set per platform. When the OS is Tizen™, it may be permissible to provide two or more API sets per platform.

The applications 370 may include a home 371, dialer 372, short message service/multimedia messaging service (SMS/MMS) 373, instant message (IM) 374, browser 375, camera 376, alarm 377, contact 378, voice dial 379, e-mail 380, calendar 381, media player 382, album 383, watch 384, health care, such as measuring an exercise quantity or blood sugar application, or an application for offering environment information, such as atmospheric pressure, humidity, or temperature. The applications 370 may include an information exchanging application that supports information exchange between an electronic device and an external electronic device. The information exchanging application may include a notification relay application for transmitting specific information to the external electronic device, or a device management application for managing the external electronic device. For example, the notification relay application may send notification information, which is generated from other applications of an electronic device, to an external electronic device or may receive the notification information from the external electronic device and may provide a user with the notification information. The device management application may install, delete, or update a function, such as turn-on/turn-off of an external electronic device itself or a part of components, or adjustment of resolution of a display of the external electronic device, which communicates with an electronic device, or an application running in the external electronic device.

The applications 370 may include a health care application of a mobile medical device that is assigned in accordance with an attribute of the external electronic device, and an application received from an external electronic device. At least a part of the program module 310 may be implemented by software, firmware, hardware, or a combination of two or more thereof, and may include modules, programs, routines, sets of instructions, or processes for performing one or more functions.

Figure 4:
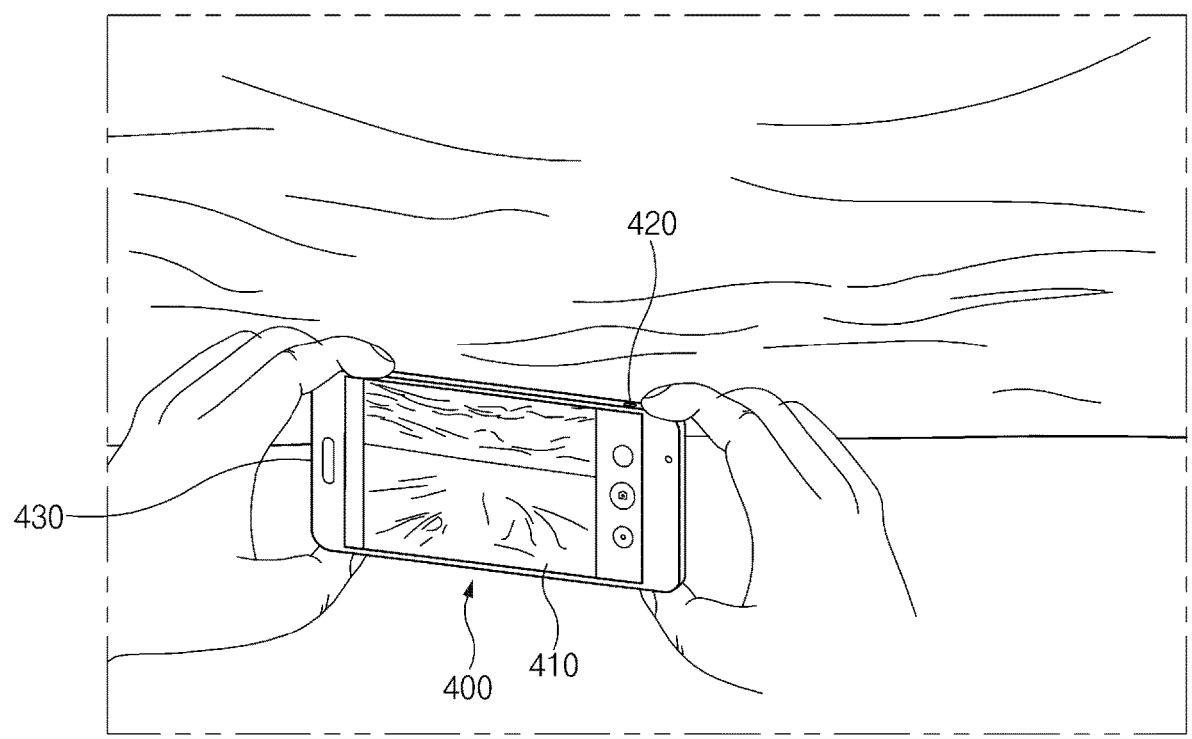
FIG. 4 illustrates an operating environment of an electronic device, according to an embodiment of the present disclosure.

FIG. 4 illustrates an operating environment of an electronic device, according to an embodiment of the present disclosure.

Referring to FIG. 4, an electronic device 400 may shoot an image in water by using a camera. For example, the electronic device 400 may be a device equipped with a waterproof function and may operate in water, such as by executing a camera application in water. The electronic device 400 may shoot a photo or a video in water and may display a preview of a photo or a video in a touch screen display 410. For example, if an input associated with an input interface 420 disposed on the side surface of the electronic device 400 occurs, the electronic device 400 may shoot a photo or may start video recording. For example, the electronic device 400 may determine whether the electronic device 400 operates in water, based on information sensed from an input/output interface 430 disposed in the lower end of the electronic device 400 and the touch screen display 410. When determining that the electronic device 400 operates in water, the electronic device 400 may display a user interface suitable for underwater shooting together with a preview in the touch screen display 410. In the present disclosure, "the electronic device is in water" means that the entire electronic device is submerged in water.

Figure 5:
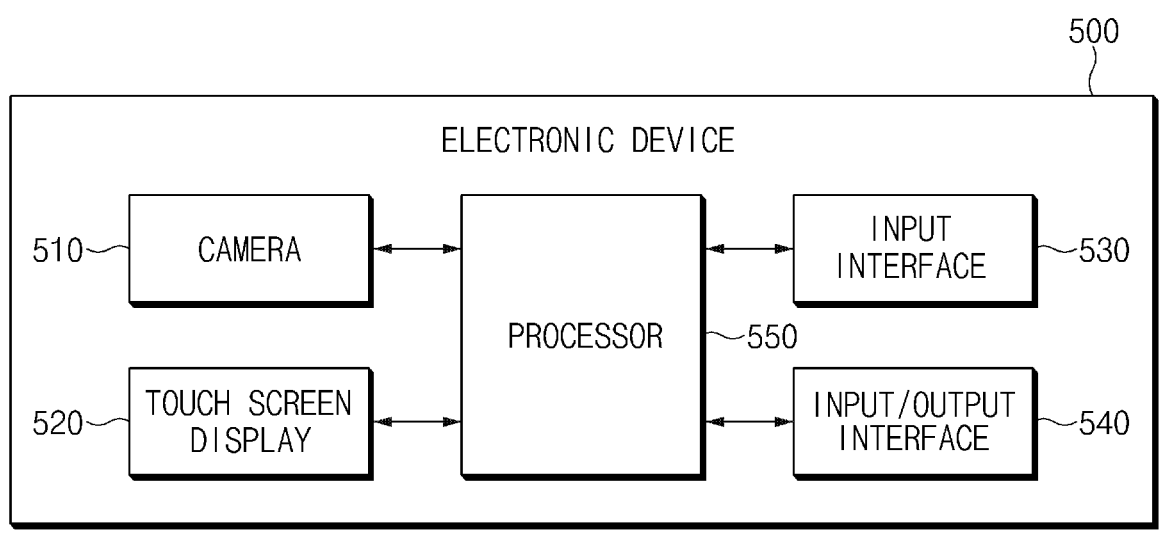
FIG. 5 illustrates a configuration of the electronic device, according to an embodiment of the present disclosure.

FIG. 5 illustrates a configuration of the electronic device, according to an embodiment of the present disclosure.

Referring to FIG. 5, an electronic device 500 may include a camera 510, a touch screen display 520, an input interface 530, an input/output interface 540, and a processor 550. The electronic device 500 may be equipped with a waterproof function and which is operable in water, and may be a smartphone, a tablet PC, a wearable device, or a digital camera, for example. The electronic device 500 may be referred to as a "mobile device", a "mobile terminal", or a "user equipment (UE)", for example.

The camera 510 may obtain an image by shooting a still image or a video, and may be controlled through the application of the camera 510 installed in the electronic device 500.

The touch screen display 520 may output a screen. For example, the touch screen display 520 may display a preview or an image, which is shot by the camera 510, and may recognize a touch input by operating in a capacitive manner. In this case, the touch screen display 520 may recognize the touch input based on the change of the capacitance in the touch screen display 520. Alternatively, the touch screen display 520 may operate in a resistive manner and may recognize the touch input based on the pressure applied to the touch screen display 520. For example, the touch screen display 520 may include a touch panel for recognizing the touch input and a display panel for outputting a screen.

The input interface 530 may receive an input by a user of the electronic device 500, such as by recognizing a physical input by an external object. For example, the input interface 530 may be a physical button, such as a volume control key, a power key, or a home key, or may be a switch operated by a physical input or may be a force sensor that senses the pressure by a physical input. As illustrated in FIG. 4, for example, the input interface 530 (430 in FIG. 4) may be disposed on the side surface of the electronic device 500.

The input/output interface 540 may be connected to an external device, may be a port capable of accommodating a plug connected to the external device, and may be a USB port capable of accommodating a USB plug. An electrical signal, such as current, may flow into the input/output interface 540 and may be changed. For example, the electrical signals flowing into the input/output interface 540 when the input/output interface 540 is empty, when a plug electrically connected to the external device is contained in the input/output interface 540, and when the input/output interface 540 is in water, may be different from each other.

The processor 550 may be electrically connected to the camera 510, the touch screen display 520, the input interface 530, and the input/output interface 540.

According to an embodiment, when an operation associated with the camera 510 is performed, the processor 550 may determine whether the electronic device 500 is in water, or may display a user interface associated with underwater shooting in the touch screen display 520, based on the electrical signal sensed from the input/output interface 540 and information obtained from the touch screen display 520.

In detail, the processor 550 may sense whether the camera 510 has been activated. For example, if the camera 510 is activated when a camera application is executed, the processor 550 may start to determine whether the electronic device 500 is in water.

The processor 550 may shoot an image by using the camera 510 in response to an input associated with the input interface 530. For example, while an application associated with the camera 510 is executed, if the input associated with the input interface 530 is sensed, the processor 550 may shoot a photo or may start video recording. Since it is difficult for the touch screen display 520 (especially a capacitive touch screen display) to recognize the touch input when the electronic device 500 is in water, the user of the electronic device 500 may shoot an image by using the input interface 530, and the processor 550 may start to determine whether the electronic device 500 is in water.

The foregoing embodiment describes the determination of whether the electronic device 500 is in water starting when the camera 510 is activated or when an image is shot in response to the input associated with the input interface 530. However, embodiments of the present disclosure may not be limited thereto. For example, when one of various operations associated with the camera 510 is performed, the electronic device 500 may start to determine whether the electronic device 500 is in water.

According to an embodiment, if the operation associated with the camera 510 is performed, the processor 550 may determine whether the electrical signal sensed from the input/output interface 540 satisfies a first specified condition. Since the electrical signals flowing into the input/output interface 540 when the input/output interface 540 is empty, when a plug of the external device is contained in the input/output interface 540, and when the input/output interface 540 is in water are different from each other, the processor 550 may determine whether the electronic device 500 is in water, based on the electrical signal sensed from the input/output interface 540.

For example, the first specified condition may include a condition associated with the magnitude range and/or frequency range of the electrical signal. The processor 550 may determine whether the electrical signal sensed from the input/output interface 540 satisfies a specified magnitude range and/or frequency range.

If the first specified condition is satisfied, the processor 550 may determine whether information associated with the touch input obtained from the touch screen display 520 satisfies a second specified condition. If the second specified condition is satisfied, the processor 550 may determine that the electronic device 500 is in water. For example, the processor 550 may obtain the information associated with the touch input from the touch screen display 520. The information associated with the touch input when the electronic device 500 is in water may be different from the information associated with the touch input when the electronic device 500 is out of water.

For example, when the touch screen display 520 is in a capacitive manner, the processor 550 may determine whether the electronic device 500 is in water, based on self-capacitance and/or mutual capacitance sensed from the touch screen display 520. If the self-capacitance and/or mutual capacitance satisfies a specified condition, the processor 550 may determine that the electronic device 500 is in water.

For another example, when the touch screen display 520 is in a resistive manner, the processor 550 may determine whether the electronic device 500 is in water, based on the pressure sensed in the entire area of the touch screen display 520. If the pressure sensed due to water pressure in the entire area of the touch screen display 520 is included in a specified range, the processor 550 may determine that the electronic device 500 is in water.

If the second specified condition is satisfied, the processor 550 may display a user interface associated with underwater shooting in the touch screen display 520. For example, if the first specified condition and the second specified condition are satisfied after an image is shot in response to an input associated with the input interface 530, the processor 550 may display the user interface suitable for underwater shooting in the touch screen display 520.

The processor 550 may display a shooting icon in an area adjacent to the input interface 530 of the touch screen display 520 for the purpose of guiding a user to shoot an image by using the input interface 530.

The processor 550 may determine the level of illumination sensed by the camera 510 and a user interface to be displayed in the touch screen display 520, based on the level of the illumination. For example, the processor 550 may determine the level of the illumination based on an aperture value (Av), a time value (Tv), and a brightness value (Bv) obtained by the camera 510, and may display different user interfaces in the touch screen display 520 depending on the level of the illumination, which will be described with reference to FIGS. 9 to 16.

Figure 6:
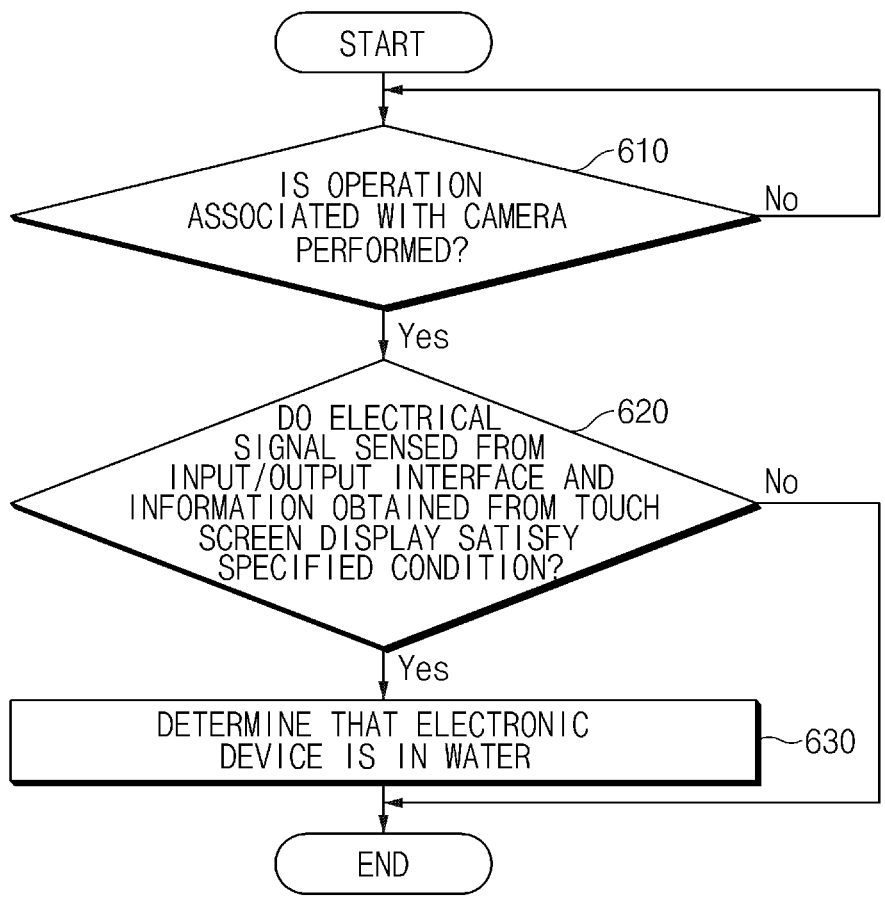
FIG. 6 illustrates an underwater shooting determining method of an electronic device, according to an embodiment of the present disclosure.

FIG. 6 illustrates an underwater shooting determining method of an electronic device, according to an embodiment of the present disclosure.

Hereinafter, it is assumed that the electronic device 500 of FIG. 5 performs the process of FIG. 6, and that the operation described as being executed by the electronic device is controlled by the processor 550 of the electronic device 500.

Referring to FIG. 6, in step 610, an electronic device may determine whether an operation associated with a camera has been performed. For example, the electronic device may determine whether the camera has been activated, or whether a camera application has been executed, or after the camera application is executed, may determine whether an input associated with a specified input interface, such as a volume increase button, has been recognized.

When the operation associated with the camera is not performed, step 610 is repeated. When the operation associated with the camera is performed, in step 620, the electronic device may determine whether an electrical signal sensed from an input/output interface and information obtained from a touch screen display satisfy a specified condition. For example, the electrical signal sensed from an input/output interface, such as a USB port, when the electronic device is in water may be changed to be different from the electrical signal when an input/output interface is empty or when a plug connected to an external device is inserted into the input/output interface. The electronic device may determine whether at least one of the magnitude or the frequency of the electrical signal sensed from the input/output interface is included in a specified range. In addition, when the electronic device is in water, the characteristic of self-capacitance and/or mutual capacitance sensed from the touch screen display may be different from that when the electronic device is out of water. The electronic device may determine whether the self-capacitance and/or the mutual capacitance sensed from the touch screen display satisfies a specified condition.

When the specified condition is not satisfied, the method ends. When the specified condition is satisfied, in step 630, the electronic device may determine that the electronic device is in water. For example, if at least one of the magnitude and the frequency of the electrical signal sensed from the input/output interface is included in the specified range and if the self-capacitance and/or the mutual capacitance sensed from the touch screen display satisfies the specified condition, the electronic device may determine in step 630 that the electronic device is in water.

Figure 7:
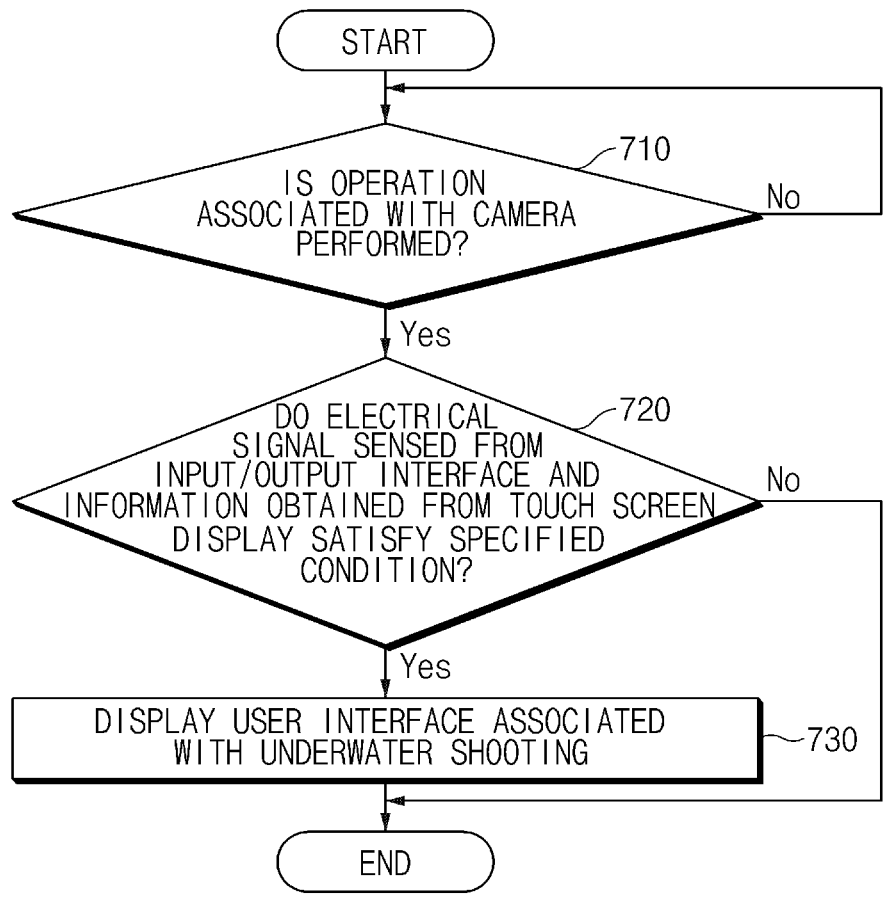
FIG. 7 illustrates an underwater shooting determining method of an electronic device, according to an embodiment of the present disclosure.

FIG. 7 illustrates an underwater shooting determining method of an electronic device, according to an embodiment of the present disclosure.

For the sake of conciseness, a description of an operation previously described with reference to FIG. 6 will be omitted.

Referring to FIG. 7, in step 710, an electronic device may determine whether an operation associated with a camera has been performed.

When determining that the operation associated with the camera is not performed, step 710 is repeated. When determining that the operation associated with the camera is performed, in step 720, the electronic device may determine whether an electrical signal sensed from an input/output interface and information obtained from a touch screen display satisfy a specified condition.

When the specified condition is not satisfied, the method ends. When the specified condition is satisfied, in step 730, the electronic device may display a user interface associated with underwater shooting. For example, the electronic device may display an icon for receiving a shooting instruction, in an area adjacent to an input interface, may display a mark indicating whether underwater shooting is proceeding, may display a mark indicating the level of illumination sensed by a camera upon shooting, or may display a mark surrounding or covering an area in which a specified object, such as a face, is recognized in a preview. The electronic device may display various user interfaces suitable for other underwater shooting.

Figure 8:
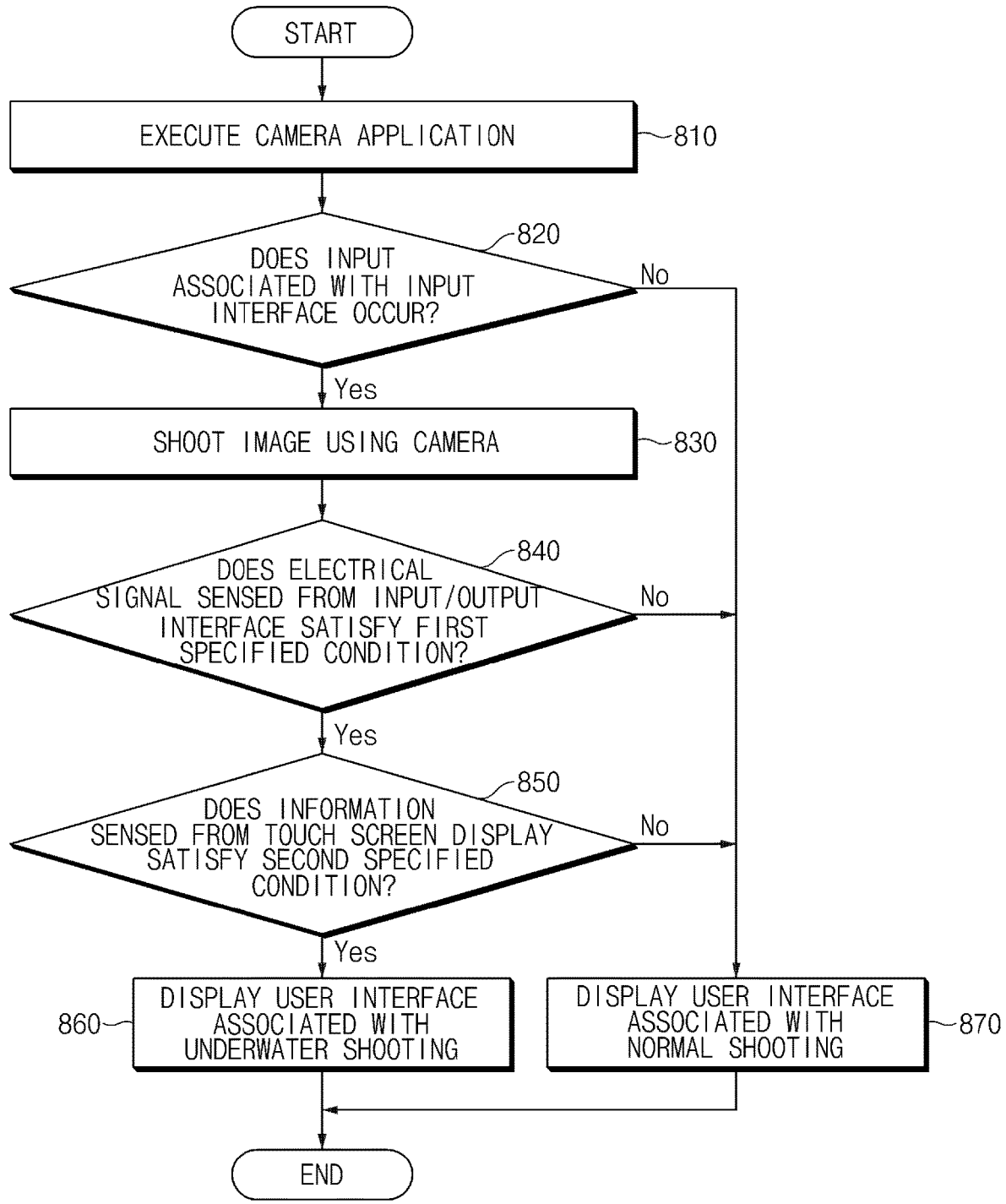
FIG. 8 illustrates an underwater shooting determining method of an electronic device, according to an embodiment of the present disclosure.

FIG. 8 illustrates an underwater shooting determining method of an electronic device, according to an embodiment of the present disclosure.

For the sake of conciseness, a description of steps described with reference to FIGS. 6 and 7 will be omitted.

Referring to FIG. 8, in step 810, the electronic device may execute a camera application. For example, the electronic device may be a waterproof device and may operate and execute the camera application in water. If the camera application is executed, the electronic device may output a preview in a touch screen display.

In step 820, the electronic device may determine whether an input associated with the input interface has occurred. For example, after the camera application is executed, the electronic device may sense an input associated with a specified input interface, such as a volume increase button.

If the input associated with the input interface occurs, in step 830, the electronic device may shoot an image by using a camera. For example, after the camera application is executed, if the input associated with the specified input interface occurs, the electronic device may shoot a photo or may start video recording. The touch screen display may not smoothly operate in water. Accordingly, if the image is shot in response to the input associated with the input interface, there is a possibility that the electronic device will operate in water. Thus, the electronic device may determine whether the electronic device is in water, by performing the following steps.

In step 840, the electronic device may determine whether an electrical signal sensed from an input/output interface satisfies a first specified condition. For example, the electronic device may determine whether the magnitude and/or the frequency of the electrical signal sensed from the input/output interface is included in a specified range.

If the first specified condition is satisfied, in step 850, the electronic device may determine whether information sensed from the touch screen display satisfies a second specified condition. For example, the electronic device may determine whether the self-capacitance and/or the mutual capacitance sensed by the capacitive touch screen display satisfies a specified condition, or may determine whether the pressure sensed by a resistive touch screen display is included in a specified range.

In FIG. 8, steps 840 and 850 are performed sequentially, but embodiments of the present disclosure may not be limited thereto. For example, steps 840 and 850 may be simultaneously performed or may be performed in a reverse sequence.

If the second specified condition is satisfied, in step 860, the electronic device may display a user interface associated with underwater shooting.

When there is no input associated with the input/output interface or when the first specified condition or the second specified condition is not satisfied, in step 870, the electronic device may display a user interface associated with normal shooting. For example, the electronic device may display a user interface the same as a user interface when the camera application is executed, without changing the user interface.

Figure 9:
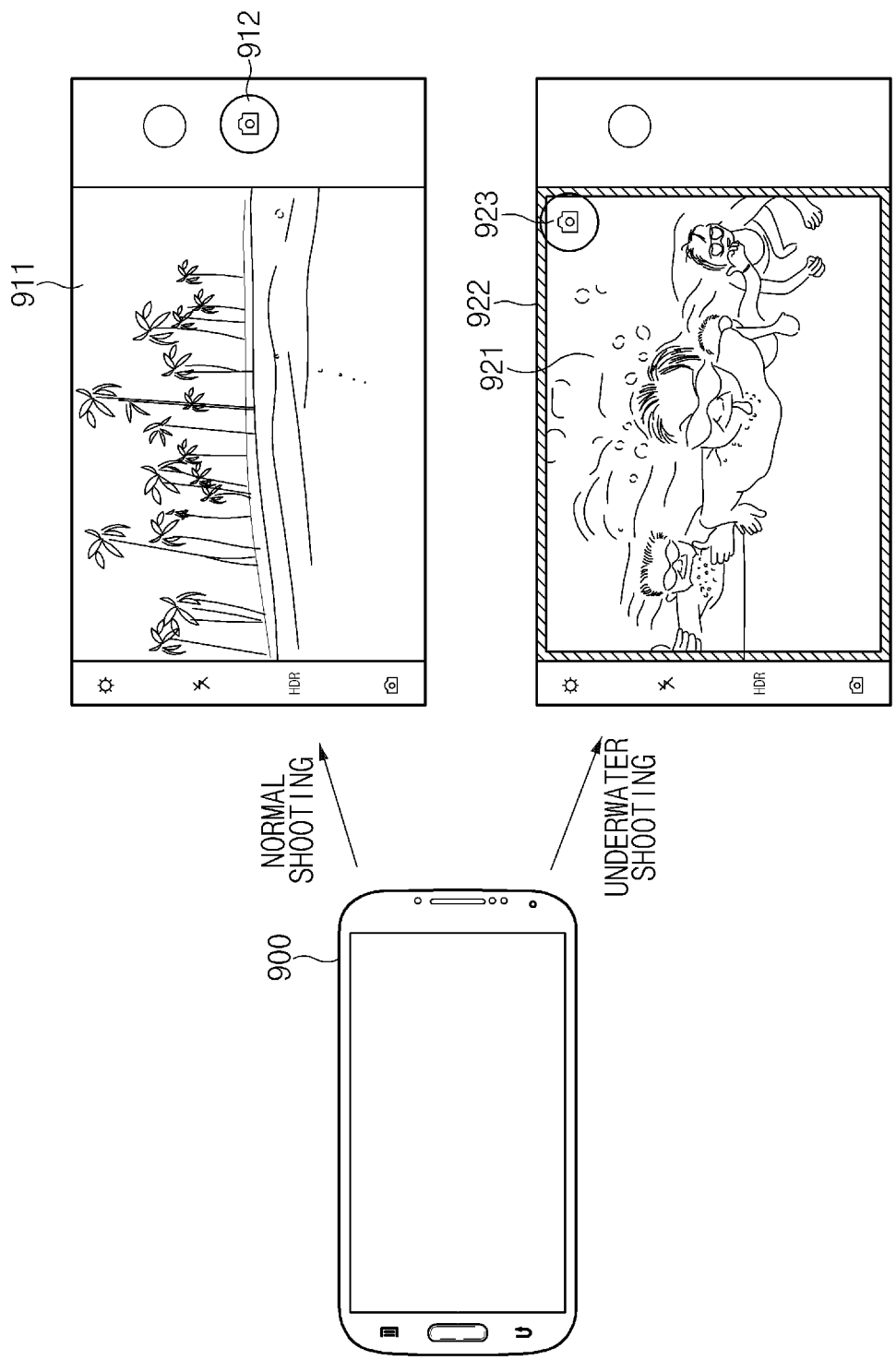
FIG. 9 illustrates a user interface output by an electronic device upon photo shooting, according to an embodiment of the present disclosure.

FIG. 9 illustrates a user interface output by an electronic device upon photo shooting, according to an embodiment of the present disclosure.

The electronic device may operate in a normal shooting mode or in an underwater shooting mode. According to an embodiment, when the electronic device operates in the underwater shooting mode, while a preview is displayed in the electronic device, the electronic device may display a mark indicating underwater shooting.

Referring to FIG. 9, an electronic device 900 may execute a camera application. When the electronic device 900 operates in a normal shooting mode, the electronic device 900 may display a preview 911 and a shooting icon 912. The electronic device 900 may display the preview 911 of an image recognized by a camera, in the center area of a screen, and may display the shooting icon 912 for receiving a shooting instruction from a user, in a right-side area of the screen.

The electronic device 900 may determine whether underwater shooting is proceeding, based on an input associated with a physical button, an electrical signal sensed at a USB port, and information sensed from a touch screen display, for example. When the electronic device 900 operates in the underwater shooting mode, the electronic device 900 may display a preview 921, an underwater shooting mark 922, and a shooting icon 923. The electronic device 900 may display the preview 921 of an image recognized by the camera, in the center area of a screen. For the purpose of notifying the user of the underwater shooting mode, the electronic device 900 may display the box-shape underwater shooting mark 922 surrounding the preview 921, or alternatively, an underwater shooting mark may be implemented with various shapes for notifying the user of underwater shooting. The electronic device 900 may display the shooting icon 923 in an area adjacent to a physical button for receiving the shooting instruction. Since it is difficult for the electronic device 900 to recognize a touch input associated with the shooting icon 923 during underwater shooting, the electronic device 900 may display the shooting icon 923 in the area adjacent to a physical button to induce an input associated with the physical button of the user.

Figure 10:
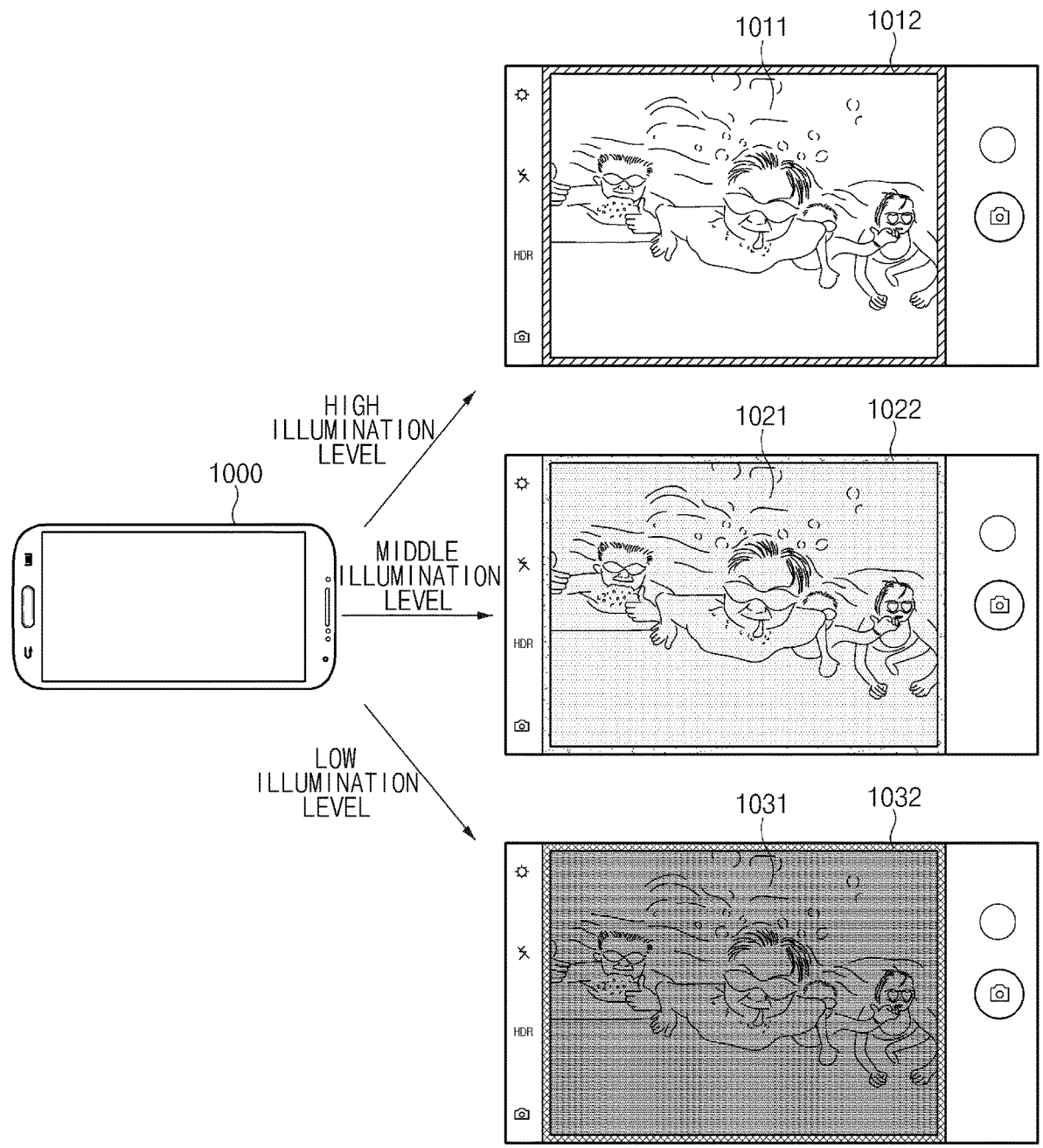
FIG. 10 illustrates a user interface output by an electronic device upon photo shooting, according to an embodiment of the present disclosure.

FIG. 10 illustrates a user interface output by an electronic device upon photo shooting, according to an embodiment of the present disclosure.

According to an embodiment, while a preview is displayed, the electronic device may display a mark indicating underwater shooting and the level of illumination.

Referring to FIG. 10, while an electronic device 1000 operates in an underwater shooting mode, the electronic device 1000 may recognize the illumination by using a camera. The electronic device 1000 may determine the level of the recognized illumination, such as determining that the level of the illumination is high, mid-level, or low level.

When the level of the illumination sensed by a camera is high, the electronic device 1000 may display a first preview 1011 and a first underwater shooting mark 1012 represented in a first color, such as blue. When the level of the illumination sensed by a camera is mid-level, the electronic device 1000 may display a second preview 1021 and a second underwater shooting mark 1022 represented in a second color, such as green. When the level of the illumination sensed by a camera is low, the electronic device 1000 may display a third preview 1031 and a third underwater shooting mark 1032 represented in a third color, such as red.

Although the underwater shooting marks 1012, 1022, and 1023 are in a box shape surrounding the previews 1011, 1021, and 1031, respectively, the present disclosure is not limited thereto, and the underwater shooting marks 1012, 1022, and 1023 may be implemented with various shapes for notifying the user of underwater shooting.

The electronic device 1000 may display a mark that enables a user to recognize the level of the illumination, and thus may allow the user to conveniently recognize the illumination in a dark underwater environment.

Figure 11:
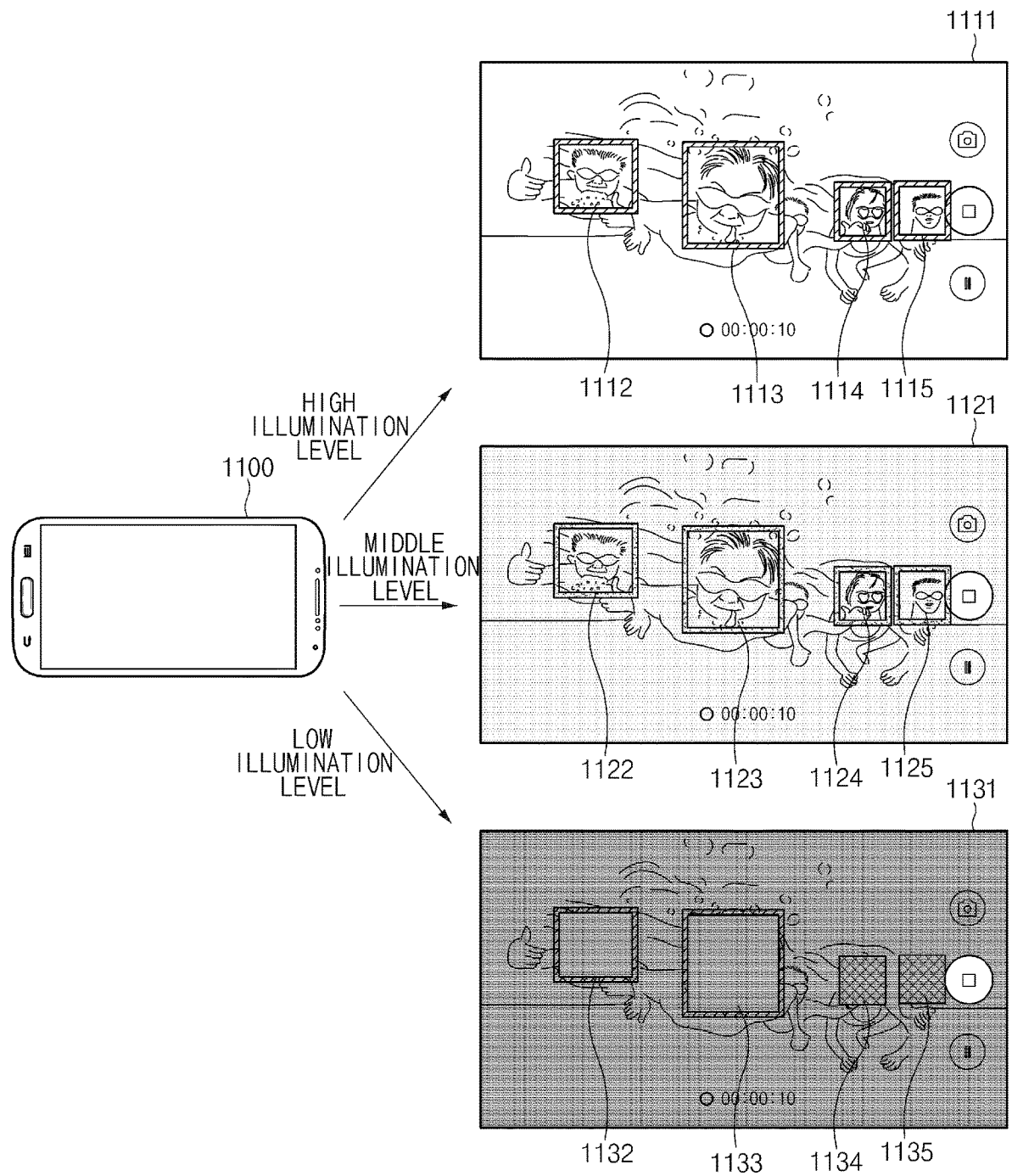
FIG. 11 illustrates a user interface output by an electronic device upon video shooting, according to an embodiment of the present disclosure.

FIG. 11 illustrates a user interface output by an electronic device upon video shooting, according to an embodiment of the present disclosure.

According to an embodiment, an electronic device may display a mark surrounding an area in which a specified object is recognized in a preview displayed in a touch screen display, based on an electrical signal sensed at a USB port and information obtained from the touch screen display. When the level of illumination sensed by a camera is lower than a specified value, the electronic device may display a mark covering the area in which the specified object is recognized in the preview displayed in the touch screen display.

Referring to FIG. 11, while an electronic device 1100 operates in an underwater shooting mode, the electronic device 1100 may recognize the illumination by using the camera and may determine that the level of the recognized illumination is high, mid-level, or low level.

When the level of the illumination sensed by the camera is high, the electronic device 1100 may display a first preview 1111 and first underwater shooting marks 1112, 1113, 1114, and 1115 represented in a first color, such as blue. The first underwater shooting marks 1112, 1113, 1114, and 1115 may be box-shaped marks surrounding an area in which a specified object, such as a face, is recognized in the first preview 1111, respectively.

When the level of the illumination sensed by the camera is mid-level, the electronic device 1100 may display a second preview 1121 and second underwater shooting marks 1122, 1123, 1124, and 1125 represented in a second color, such as green. The second underwater shooting marks 1122, 1123, 1124, and 1125 may be box-shaped marks surrounding an area in which the face is recognized in the second preview 1121, respectively.

When the level of the illumination sensed by the camera is low, the electronic device 1100 may display a third preview 1131 and third underwater shooting marks 1132, 1133, 1134, and 1135 represented in a third color, such as red and/or white. Since it is difficult for the user of the electronic device 1100 to identify a face in the third preview 1131, the third underwater shooting marks 1132, 1133, 1134, and 1135 may be box-shaped marks covering an area in which a face is recognized in the third preview 1131, respectively, such that the user is capable of identifying only the location of the face.

The third preview 1131 may include a plurality of faces, and the reliability of recognition for each of the plurality of faces may be different from each other. For example, the reliability of recognition for each of faces included in the underwater shooting marks 1132 and 1133 may be higher than a specified value, and the reliability of recognition for each of faces included in the underwater shooting marks 1134 and 1135 may be lower than the specified value. The electronic device 1100 may display the underwater shooting marks 1132 and 1133 having the high reliability of recognition in white and may display the underwater shooting marks 1134 and 1135 having the low reliability of recognition in red.

In FIG. 11, each of the first underwater shooting marks 1112, 1113, 1114, and 1115, each of the second underwater shooting marks 1122, 1123, 1124, and 1125, and each of the third underwater shooting marks 1132, 1133, 1134, and 1135 is in the box shape surrounding specified object. However, the present disclosure is not limited thereto. For example, the underwater shooting marks may be implemented with various shapes for notifying the user of the location of the specified object. In addition, the specified object may include various objects that the electronic device 1100 is capable of recognizing, other than the face illustrated in FIG. 11.

Figure 12:
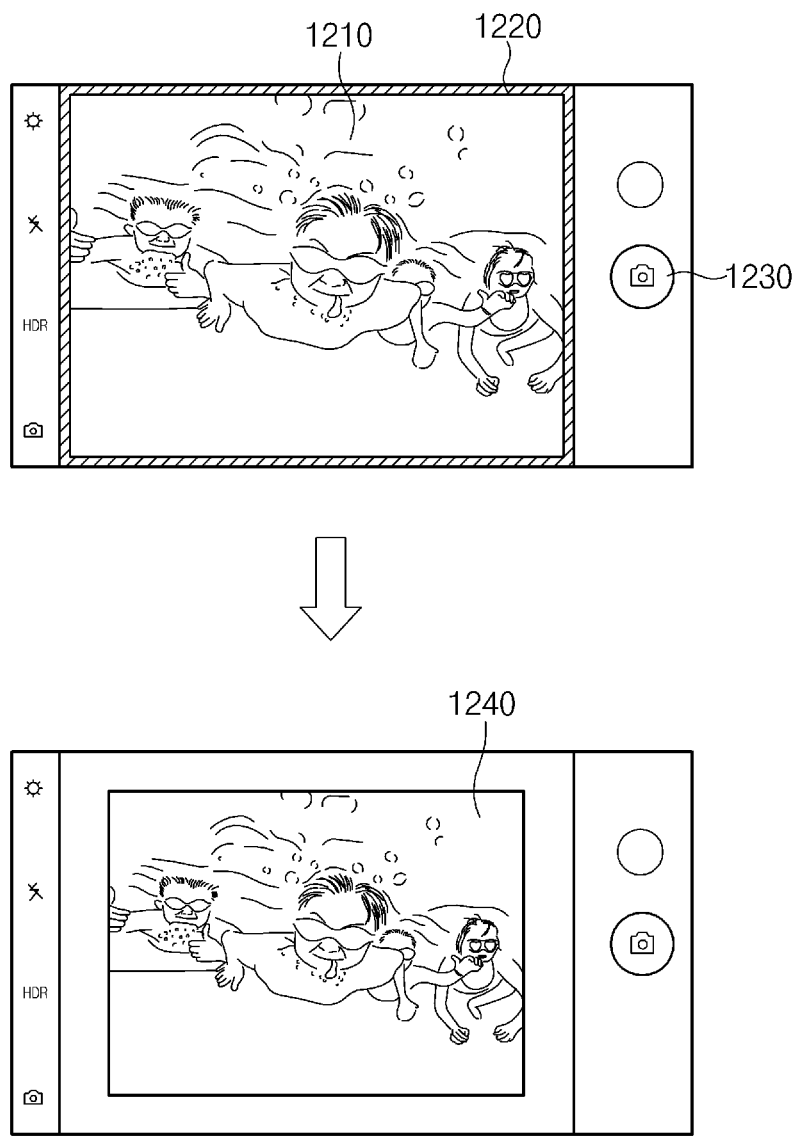
FIG. 12 illustrates a user interface output by an electronic device upon photo shooting, according to an embodiment of the present disclosure.

FIG. 12 illustrates a user interface output by an electronic device upon photo shooting, according to an embodiment of the present disclosure.

According to an embodiment, after the electronic device displays a user interface associated with underwater shooting, if an image is shot by a camera, an electronic device may display the image in a touch screen display during a specified time.

Referring to FIG. 12, an electronic device 1200 may determine whether underwater shooting is proceeding, based on an input associated with a physical button, an electrical signal sensed at a USB port, or information sensed from a touch screen display, for example. When the electronic device 1200 operates in the underwater shooting mode, the electronic device 1200 may display a preview 1210, an underwater shooting mark 1220, and a shooting icon 1230. The electronic device 1200 may display the preview 1210 of an image recognized by a camera, in the center area of a screen and may display the box-shaped underwater shooting mark 1220 surrounding the preview 1210. If an input associated with the shooting icon 1230 or a physical button is applied, the electronic device 1200 may shoot an image.

If the image is shot, the electronic device 1200 may display a shot image 1240 in a screen during a specified time, such as about 2 sec. Since it is difficult for a user to verify the shot image 1240 when the electronic device 1200 is in water, the electronic device 1200 may display the shot image 1240 during a specified time such that the user verifies the shot image 1240 during shooting.

Figure 13:
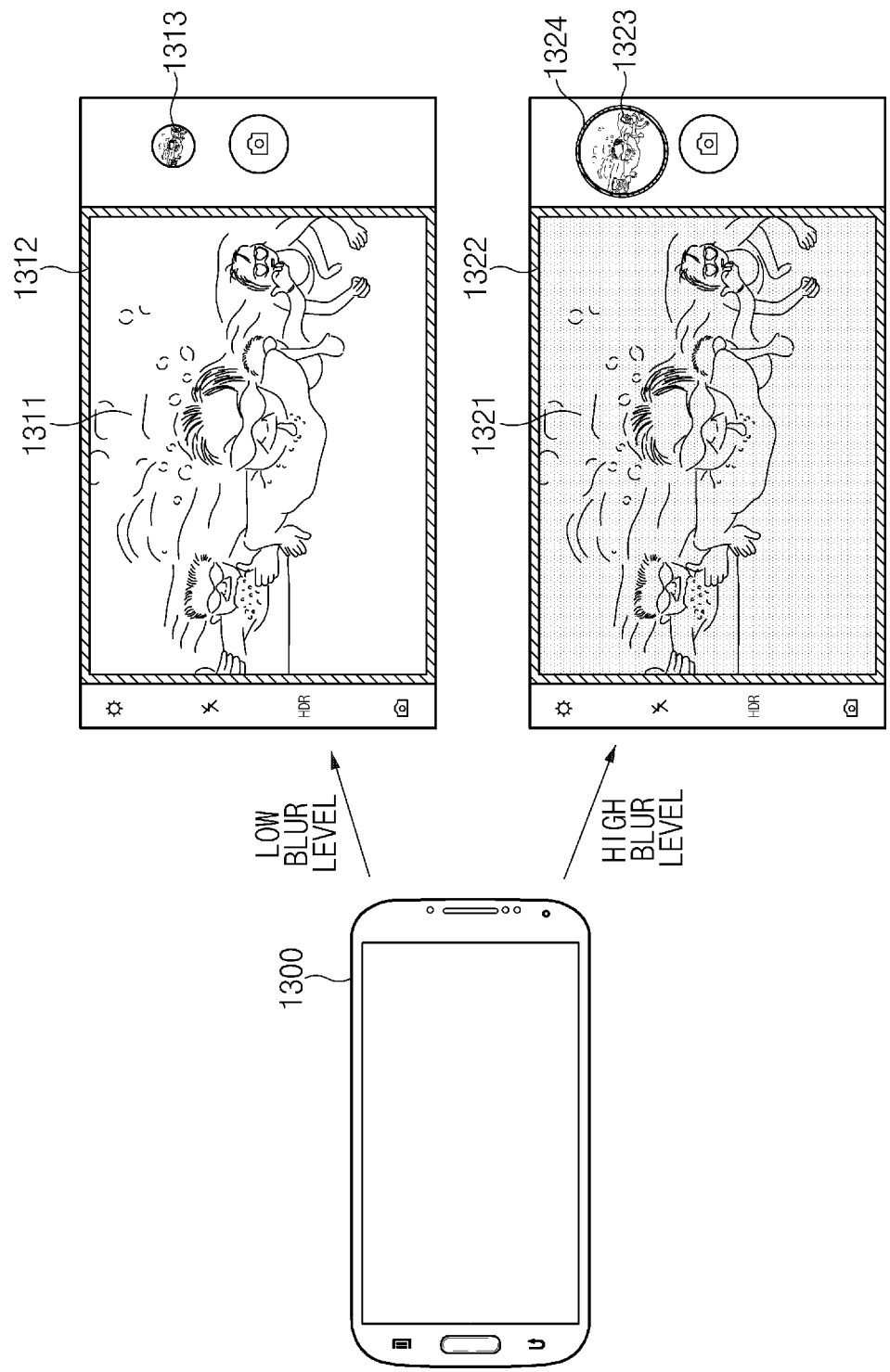
FIG. 13 illustrates a user interface output by an electronic device upon photo shooting, according to an embodiment of the present disclosure.

FIG. 13 illustrates a user interface output by an electronic device upon photo shooting, according to an embodiment of the present disclosure.

According to embodiments, after the electronic device displays a user interface associated with underwater shooting, if an image is shot by a camera, an electronic device may display the thumbnail of the shot image in a touch screen display together with a mark indicating underwater shooting, may display a mark indicating the thumbnail of the shot image and a blur level of the shot image, in the touch screen display, or may display the thumbnail of the shot image in the touch screen display, and the size of the displayed thumbnail may be determined based on the blur level of another image.

Referring to FIG. 13, an electronic device 1300 may display a first preview 1311 and a first underwater shooting mark 1312. The electronic device 1300 may display a first thumbnail 1313 associated with the shot image. For example, when the shot image is shot in water, the electronic device 1300 may display a circular mark surrounding the first thumbnail 1313 together with the first thumbnail 1313. For another example, when the blur level of the shot image is low, the electronic device 1300 may display the first thumbnail 1313 of a general type.

For another example, the electronic device 1300 may display a second preview 1321 and a second underwater shooting mark 1322, and may display a second thumbnail 1323 associated with the shot image. The size of the second thumbnail 1323 may be greater than the size of the first thumbnail 1313. For example, as the blur level increases, the electronic device 1300 may display a larger thumbnail. The electronic device 1300 may display a circular mark 1324 surrounding the second thumbnail 1323. For example, if the blur level is higher than a specified value, the electronic device 1300 may display a red mark 1324 surrounding the second thumbnail 1323. Alternatively, the mark 1324 may be implemented with various shapes and colors that enable a user to recognize a blur level.

The electronic device 1300 may adjust the size of the thumbnail based on the blur level and may display the mark 1324 indicating the blur level, and thus, the electronic device 1300 may enable the user to recognize the blur level of the shot image and may induce reshooting when the blur level is high.

According to an embodiment, after the electronic device displays a user interface associated with underwater shooting, if an image is shot by a camera, the electronic device may generate a tag including information about at least part of whether the shot image is shot in water, the level of illumination sensed by the camera upon shooting the shot image, whether a focus is turned on or off upon shooting the shot image, or the number of objects recognized in the shot image.

Figure 14:
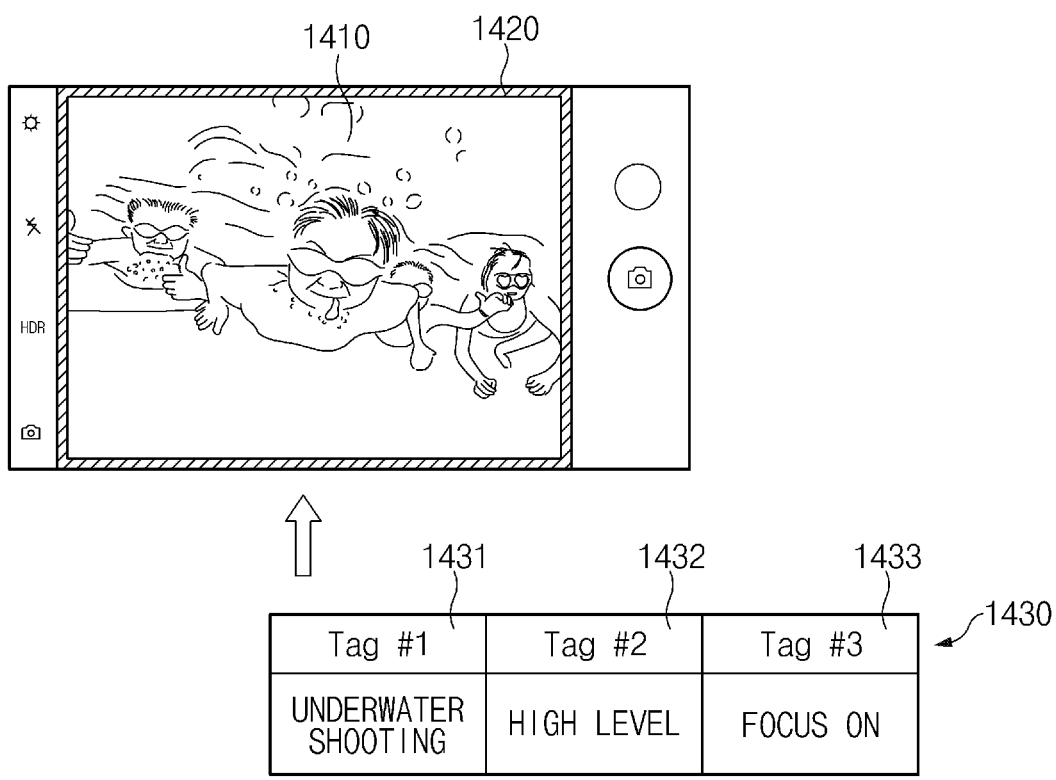
FIG. 14 illustrates a tag associated with a photo shot by an electronic device, according to an embodiment of the present disclosure.

FIG. 14 illustrates a tag associated with a photo shot by an electronic device, according to an embodiment of the present disclosure.

Referring to FIG. 14, an electronic device may display a preview 1410 and an underwater shooting mark 1420, during which time the electronic device may shoot a photo. The electronic device may determine whether a photo is shot in water when a photo is shot, the level of illumination sensed by a camera upon shooting the photo, and whether a focus is turned on or off upon shooting the shot image, and may generate a tag 1430 providing this indication. For example, the electronic device may generate a first tag #1 1431 indicating that a photo has been shot in water, a second tag #2 1432 indicating that the level of illumination is high upon shooting the photo, and a third tag #3 1433 indicating that focus is on upon shooting. The electronic device may store the tags 1430 together with the shot photo.

Figure 15:
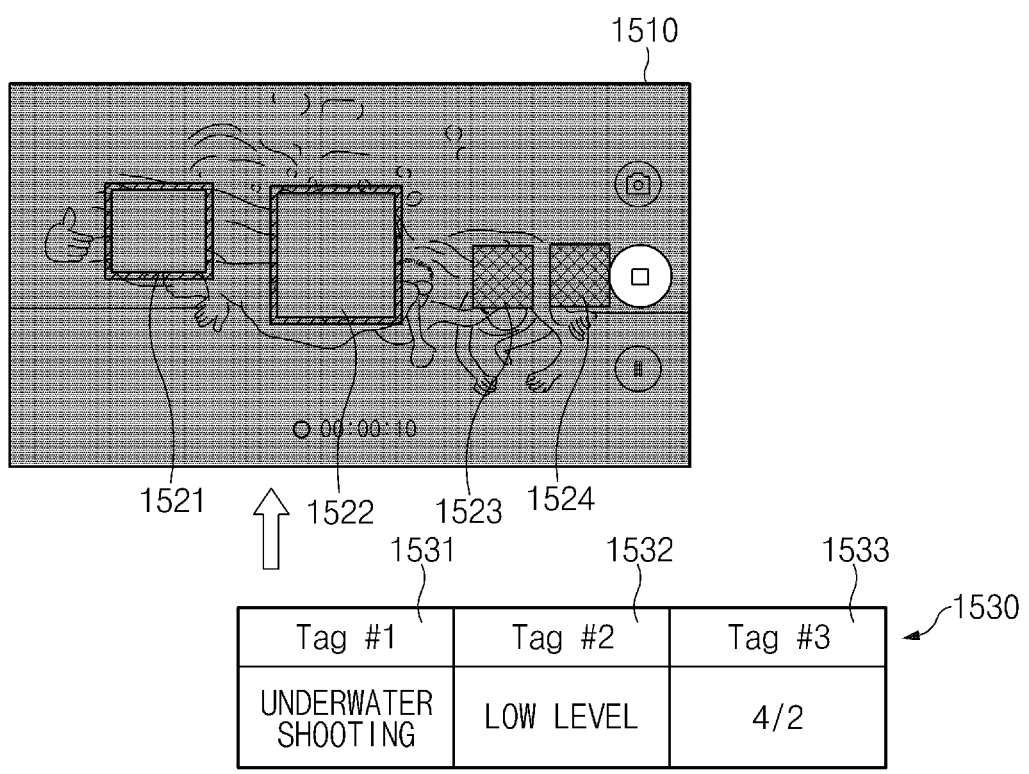
FIG. 15 illustrates a tag associated with a video shot by an electronic device, according to an embodiment of the present disclosure.

FIG. 15 illustrates a tag associated with a video shot by an electronic device, according to an embodiment of the present disclosure.

Referring to FIG. 15, an electronic device may display a preview 1510 and underwater shooting marks 1521, 1522, 1523, and 1524 covering faces recognized in the preview 1510. While the preview 1510 and the underwater shooting marks 1521, 1522, 1523, and 1524 are displayed, the electronic device may shoot a video. The electronic device may determine whether the video is shot in water when the video is shot, the level of illumination sensed by a camera upon shooting the video, and the number of recognized faces upon shooting the video, and may generate a tag 1530 providing this indication. For example, the electronic device may generate a first tag #1 1531 indicating that a video has been shot in water, a second tag #2 1532 indicating that the level of illumination is low upon shooting the video, and a third tag #3 1533 indicating that the number of recognized faces is four and the number of faces of the low reliability of recognition among the recognized faces is two, upon shooting the video. The electronic device may store the tags 1530 together with the shot video.

Figure 16:
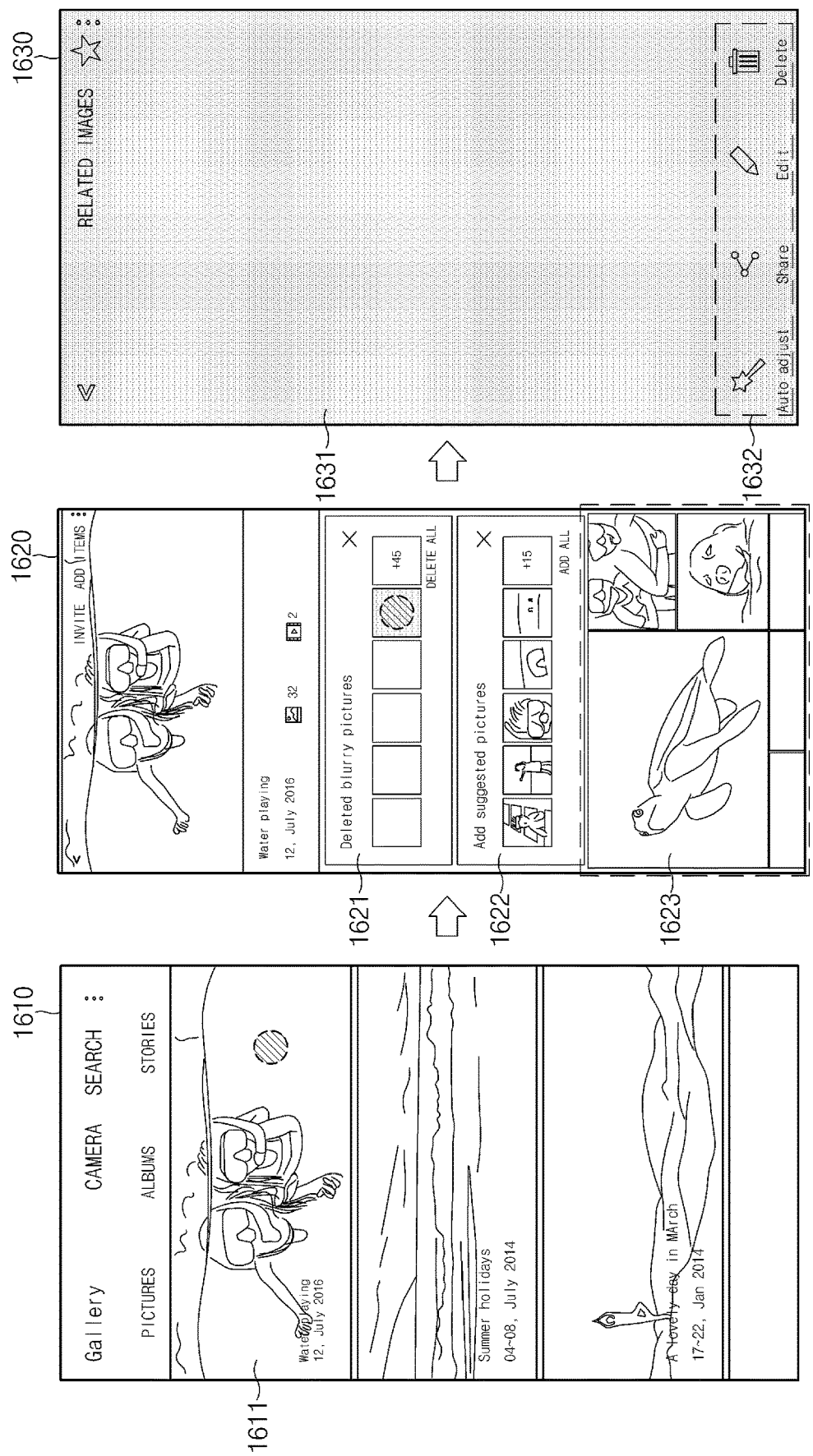
FIG. 16 illustrates a user interface for recommendation of an image output by an electronic device, according to an embodiment of the present disclosure.

FIG. 16 illustrates a user interface for recommendation of an image output by an electronic device, according to an embodiment of the present disclosure.

According to an embodiment, after an electronic device displays a user interface associated with underwater shooting, if at least one image is shot by a camera, the electronic device may recommend at least part of the at least one image, based on a tag associated with each of one or more images.

Referring to FIG. 16, the electronic device may classify photos stored in the electronic device, depending on a preset standard. The electronic device may display a list of a group of the classified photos in a first screen 1610, which may display an object 1611 for selecting the group of the photos shot in water. If a touch input associated with the object 1611 is applied by a user, the electronic device may display a second screen 1620.

The electronic device may display a first menu 1621 including thumbnails of low-quality photos, a second menu 1622 including thumbnails of high-quality photos, and a third menu 1623 for displaying previews of photos included in the group of the photos shot in water, in the second screen 1620. The electronic device may classify low-quality photos and high-quality photos based on blur levels of the photos. If a touch input of the user is applied to one of thumbnails included in the second menu 1622, the electronic device may display the third screen 1630.

The electronic device may display an image 1631 corresponding to the selected thumbnail in the third screen 1630 and icons 1632 for receiving an instruction associated with the image 1631. The icons 1632 may include an auto adjust icon, a share icon, an edit icon, and a delete icon, but are not limited thereto. If a touch input associated with the delete icon is applied, the image 1631 may be deleted.

The term "module" used herein may include a unit, which is implemented with hardware, software, or firmware, and may be interchangeably used with the terms "logic", "logical block", "component", or "circuit", for example. The "module" may be a minimum unit of an integrated component or a part thereof or may be a minimum unit for performing one or more functions or a part thereof. The "module" may be implemented mechanically or electronically and may include an application-specific IC (ASIC) chip, a field-programmable gate array (FPGA), and a programmable-logic device for performing some operations, which are known or will be developed. According to embodiments, at least a part of an apparatus or a method may be implemented by instructions stored in a computer-readable storage media in the form of a program module. The instruction, when executed by a processor, may cause the processor to perform a function corresponding to the instruction. The computer-readable recording medium may include a hard disk, a floppy disk, magnetic media, an optical media, such as a compact disc read only memory (CD-ROM) and a digital versatile disc (DVD), a magneto-optical media, such as a floptical disk), or an embedded memory, for example. The instruction may include codes created by a compiler or codes that are capable of being executed by a computer by using an interpreter. A module or a program module may include at least one of the above elements, or a part of the above elements may be omitted, or other elements may be further included. Operations executed by modules, program modules, or other elements may be executed by a successive, parallel, repeated, or heuristic method, or at least one part of operations may be executed in different sequences or omitted. Alternatively, other operations may be added.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a camera;
a touch screen display configured to recognize a touch input;
an input interface configured to receive an input from a user of the electronic device;
an input/output interface configured to accommodate a plug connected to an external device; and
a processor operatively coupled to the camera, the touch screen display, the input interface, and the input/output interface,
wherein the processor is configured to:
determine, if an operation associated with the camera is performed, whether an electrical signal sensed from the input/output interface satisfies a first specified condition;
determine, if the first specified condition is satisfied, whether information associated with the touch input obtained from the touch screen display satisfies a second specified condition;
determine, if the second specified condition is satisfied, that the electronic device is in water;
determine a level of illumination, a number of recognized faces, and a reliability of recognition for a face sensed by the camera;
determine a color for a shooting mark based on the level of the illumination and the reliability of recognition for the face;
display, on the touch screen display, a preview including the face and the shooting mark in the determined color on the face; and
shoot a content by the camera, and generate a tag to be stored with the content, wherein the tag includes the number of recognition faces and a number of faces of a low reliability of recognition among the recognized faces.

2. The electronic device of claim 1,
wherein the processor is further configured to determine whether the electronic device is in water, if an image is shot by the camera in response to an input to the input interface.

3. An electronic device comprising:
a camera;
a touch screen display configured to recognize a touch input;
an input interface configured to receive an input from a user of the electronic device;
an input/output interface configured to accommodate a plug connected to an external device; and
a processor operatively coupled to the camera, the touch screen display, the input interface, and the input/output interface,
wherein the processor is configured to:
shoot an image using the camera in response to the input to the input interface;

determine, if the image is shot in response to the input to the input interface, whether an electrical signal sensed from the input/output interface satisfies a first specified condition;

determine, if the first specified condition is satisfied, whether information associated with the touch input obtained from the touch screen display satisfies a second specified condition;

display, if the second specified condition is satisfied, a user interface associated with the underwater shooting on the touch screen display;

determine a level of illumination, a number of recognized faces, and a reliability of recognition for a face sensed by the camera;

determined a color for a shooting mark based of the level of the illumination and the reliability of recognition for the face;

display, on the touch screen display, a preview including the face and the shooting mark in the determined color on the face; and shoot a content by the camera, and generate a tag to be stored with the content, wherein the tag includes the number of recognized faces and a number of faces of a low reliability of recognition among the recognized faces.

4. The electronic device of claim 3,
wherein the processor is further configured to display a shooting icon in an area of the touch screen display that is adjacent to the input interface.

5. The electronic device of claim 3, wherein the processor is further configured to:
determine the user interface to be displayed on the touch screen display, based on the level of the illumination.

6. The electronic device of claim 3,
wherein the processor is further configured to display, while a preview is displayed on the touch screen display, a mark indicating the underwater shooting on the touch screen display.

7. The electronic device of claim 5,
wherein the processor is further configured to display, while a preview is displayed on the touch screen display, a mark indicating the underwater shooting and the level of the illumination, on the touch screen display.

8. The electronic device of claim 3,
wherein the processor is further configured to display, after displaying the user interface, if another image is shot by the camera, the another image on the touch screen display during a specified time.

9. The electronic device of claim 3,
wherein the processor is further configured to display, after displaying the user interface, if another image is shot by the camera, a thumbnail of the another image on the touch screen display together with a mark indicating the underwater shooting.

10. The electronic device of claim 3,
wherein the processor is further configured to display, after the processor displays the user interface, if another image is shot by the camera, a thumbnail of the another image on the touch screen display, and
wherein a size of the thumbnail is determined based on a blur level of the another image.

11. The electronic device of claim 3, wherein the processor is configured to display, after the processor displays the user interface, if another image is shot by the camera, a thumbnail of the another image and a mark indicating a blur level of the another image, on the touch screen display.

12. The electronic device of claim 3, wherein the processor is further configured to display a mark surrounding an area, in which a specified object is recognized in the preview displayed on the touch screen display based on the electrical signal sensed from the input/output interface and information obtained from the touch screen display.

13. The electronic device of claim 3, wherein the processor is further configured to display, if the level of illumination sensed by the camera is less than a specified value, a mark covering an area, in which a specified object is recognized, in the preview displayed on the touch screen display.

14. The electronic device of claim 3, wherein the processor is configured to:
after the processor displays the user interface, if another image is shot by the camera, generate a tag including information about at least part of whether the another image is shot in water, a level of illumination sensed by the camera during shooting of the another image, whether a focus is turned on or off during the shooting of the another image, and the number of objects recognized in the another image.

15. The electronic device of claim 3, wherein the processor is configured to:
after the processor displays the user interface, if at least one image is shot by the camera, recommend at least part of the at least one image based on a tag associated with each of the one or more images.

16. A method for determining an environment of an electronic device including a camera, a touch screen display, and an input/output interface configured to accommodate a plug connected to an external device, the method comprising:

executing a camera application of the camera;

determining, if an operation associated with the camera is performed, whether an electrical signal sensed from the input/output interface satisfies a first specified condition;

determining, if the first specified condition is satisfied, whether information associated with the touch input obtained from the touch screen display satisfies a second specified condition;

determining, if the second specified condition is satisfied, that the electronic device is in water;

determine a level of illumination, a number of recognized faces, and a reliability of recognition for a face sensed by the camera;

determined a color for a shooting mark based of the level of the illumination and the reliability of recognition for the face;

display, on the touch screen display, a preview including the face and the shooting mark in the determined color on the face; and shoot a content by the camera, and generate a tag to be stored with the content, wherein the tag includes the number of recognized faces and a number of faces of a low reliability of recognition among the recognized faces.

* * * * *